United States Patent [19]
Goeltz et al.

[11] 3,779,237

[45] Dec. 18, 1973

[54] METHOD AND SYSTEM FOR AUTOMATIC PROCESSING OF PHYSIOLOGICAL INFORMATION IN GREATER THAN REAL TIME

[75] Inventors: Richard R. Goeltz, Greece; Howard Schumacher, Rochester; Albee Roth, Far Rockaway, all of N.Y.

[73] Assignee: Electrocardio Dynamics, Inc., Rochester, N.Y.

[22] Filed: Apr. 13, 1971

[21] Appl. No.: 133,627

[52] U.S. Cl. ......................... 128/2.06 A, 128/2.1 A
[51] Int. Cl. .................................... A61b 5/04
[58] Field of Search .................. 128/2.06 A, 2.06 B, 128/2.06 F, 2.06 G, 2.06 R, 2.06 Q, 2.05 R, 2.1 A

[56] References Cited
UNITED STATES PATENTS

| 3,524,442 | 8/1970 | Horth | 128/2.06 A |
|---|---|---|---|
| 3,618,593 | 11/1971 | Nachev et al. | 128/2.06 A |
| 3,229,687 | 1/1966 | Holter et al. | 128/2.06 A |
| 3,586,835 | 6/1971 | Foeh, Jr. | 128/2.06 F |
| 3,087,488 | 4/1963 | Streimer | 128/2.05 Q |
| 3,587,563 | 6/1971 | Ragsdale | 128/2.06 A |
| 3,602,222 | 8/1971 | Herndon | 128/2.06 F |
| 3,581,735 | 6/1971 | Gentner et al. | 128/2.06 F |
| 3,633,569 | 1/1972 | Brayshaw | 128/2.06 A |

OTHER PUBLICATIONS

Kahn et al., "American Journal of Medical Electronics," Apr.–June 1963, pp. 152–157.

Botsch, "Temperature: Its Measurement & Control in Science & Industry" Vol. 3, pp. 21–29.

*Primary Examiner*—William E. Kamm
*Attorney*—Martin Lukacher

[57] ABSTRACT

A system and method is described whereby electrocardiograph signals are translated into digital data which represents certain cardiac events. This digital data controls an electrocardiogram recorder for recording the cardiac complexes which manifest only those events which are represented by the digital signals. In this way the system is capable of processing long term (for example 24-hour) durations of activity so as to select only such data of particular interest as for example data which represents abnormalities and diseases of the heart.

74 Claims, 18 Drawing Figures

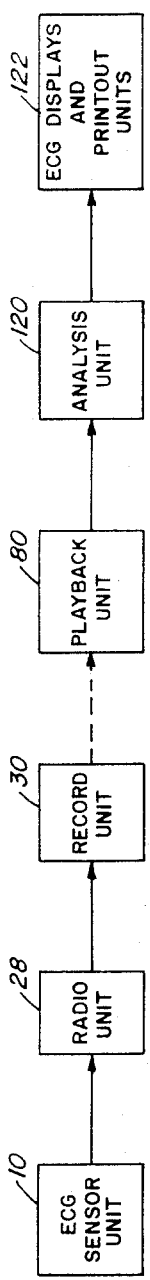
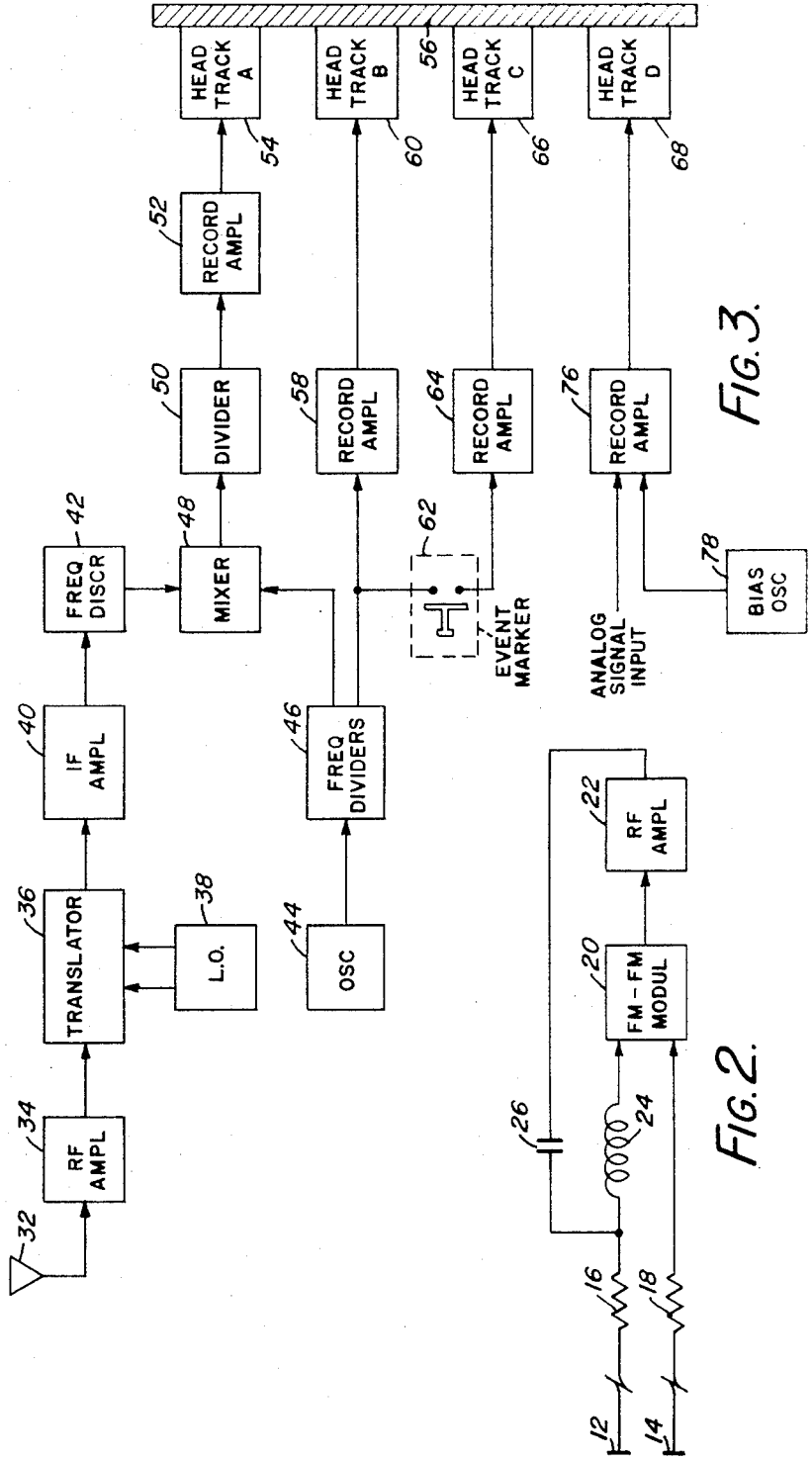

INVENTORS
RICHARD R. GOELTZ
ALBEE ROTH AND
BY HOWARD SCHUMACHER

ATTORNEY

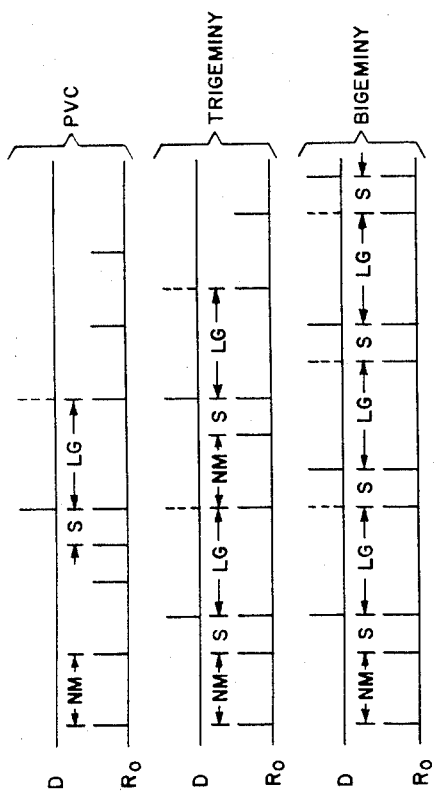
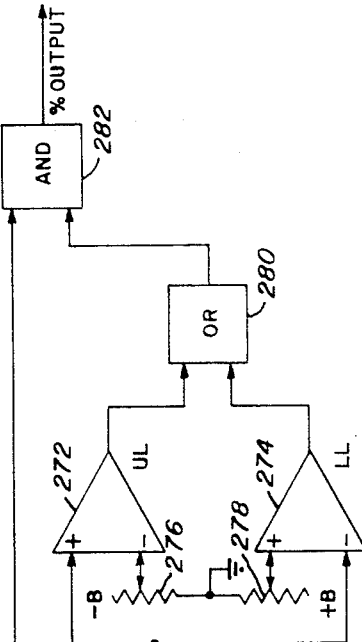
FIG.11A.
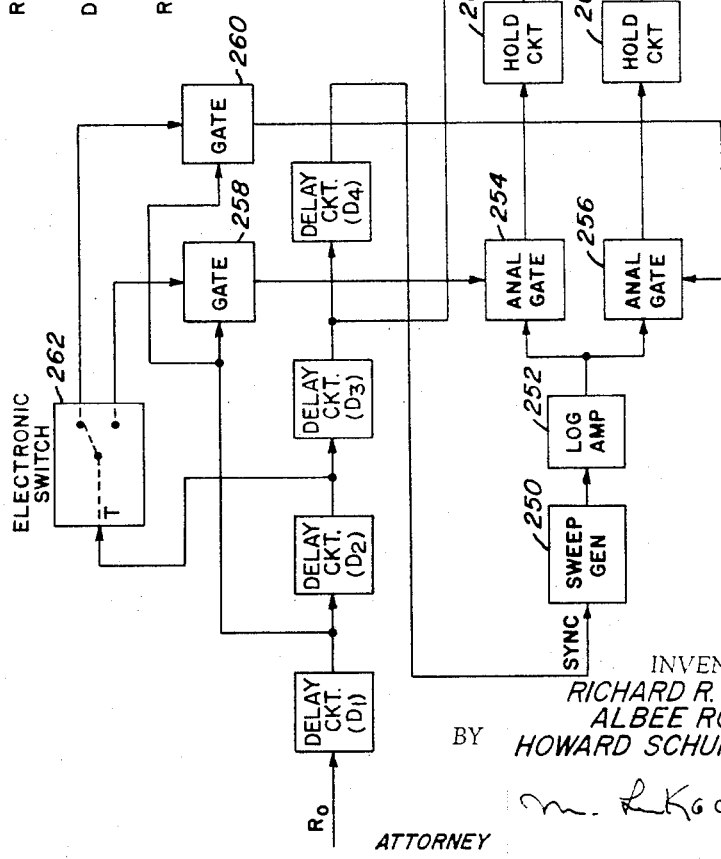
FIG.12.
INVENTORS
RICHARD R. GOELTZ
ALBEE ROTH AND
HOWARD SCHUMACHER
BY
ATTORNEY

METHOD AND SYSTEM FOR AUTOMATIC PROCESSING OF PHYSIOLOGICAL INFORMATION IN GREATER THAN REAL TIME

The present invention relates to methods of and systems for processing of physiological information and particularly to methods and systems for the processing of electrocardiographic information, such as the information which is contained in electrocardiogram signals (ECG signals) and represent the cariovascular responses.

The invention is especially suitable for use in processing of long term (e.g., 24-hour) ECG signals, so as to obtain data which may be useful in the prognosis of heart disease as well as understanding of the mechanisms which may cause the onset of myocardial infarction. The invention is also especially useful in prognostically detecting individuals likely to experience sudden cardiac death, and follow-up studies and rehabilitation programs for myocardial infarction patients, investigating the effects of pharmacologic agents in suppressing cardiac ectopic activities and in monitoring patients after cardiac surgery. The features of the invention will however also be applicable to a processing of other physiological information, whether of long term or short term duration. The automatic features of operation provided by the invention, for example, may be utilized for the processing and analysis of specific physiological information of interest.

The reduction of death and disability from heart attack often times requires the analysis of the electrocardiogram obtained from a patient in the course of his normal activities over a long period of time. In addition, ambulatory, long term electrocardiograms, by which is meant electrocardiograms taken while the patient is in motion rather than resting, are desirable over predetermined stress situations so that the variation with different activities and at different times of day may be ascertained. Similarly, ambulatory, long term electrocardiograms are of particular interest in cases where pharmacologic agents are utilized in order to determine the effect of such agents on the cardiac response of particular individuals.

The voluminous data acquired in the course of ambulatory, long term electrocardiography is not suitable for conventional analysis. It is necessary to process the electrocardiographic information in a manner to yield data which characterizes abnormalities or cardiac events of interest in the prognosis of myocardial infarction, ectopic activity and other aspects of heart disease. Thus it is desirable to automatically reduce the total volume of electrocardiographic information to yield that data which is characteristic of abnormalities of interest.

It is especially desirable that the methods and systems of analysis be automatic in operation and yet rapid and effective in acquiring, detecting and recording abnormal cardiac responses, such as abnormal cardiograph sequences, cardiac cycles which are characterized by arrhythmia, conduction disturbances, fibrillation, premature ventricular contraction (PVC), and in addition, recording the time or condition during which the abnormality occurred.

Effective interpretation of electrocardiograms and diagnosis therefrom depends upon electrocardiogram recordings of the cardiac cycles depicting the relevant abnormalities without introducing irrelevant or redundant information which is likely to be encountered, especially during long-term electrocardiographic monitoring situations.

Thus it is a principal object of the present invention to provide an improved method and system for processing of physiological information, such as electrocardiographic information, which automatically provides graphic records of the abnormal or other desired areas of the information, which records can be made available in permanent or hard copy form for diagnosis and other clinical purposes.

It is another object of this invention to provide improved apparatus and methods for analysis of physiological information, especially information acquired over a long period of time, which method and system is operative to reduce the information into a form which permits analysis of the patient's responses which are of interest, such as abnormal physiological effects manifested by the information.

It is still another object of the invention to provide an improved method of and system for acquisition, analysis and graphic recording of physiological information in a manner to provide, automatically, permanent records of portions of the information which characterize predetermined types of physiological events.

It is a still further object of the present invention to provide an improved method of and system for electrocardiography.

It is a further object of the present invention to provide an improved method of and system for electronic electrocardiography which can automatically process long-term electrocardiograms to provide only those sequences which characterize abnormal cardiac events.

It is a still further object of the present invention to provide an improved method of and apparatus for electrocardiography which is more reliable and accurate than apparatus of this type which has been heretofore available.

It is a still further object of the present invention to provide an improved method and apparatus for acquisition, analysis and processing of ambulatory long-term electrocardiographic information.

It is a still further object of the present invention to provide an improved system of and method for detection, analysis and recording of evanescent electrocardiographic abnormalities.

It is a still further object of the present invention to provide an improved system for and method of long-term electrocardiographic recordings, analysis of data resulting from such recordings, and the reduction of such data into electrocardiograms showing dysrhythmias and other possibly abnormal cardiac sequences.

It is a still further object of the present invention to provide improved apparatus for and methods of the display of cardiac sequences in real time.

It is a still further object of the present invention to provide improved methods of and systems for electrocardiography in which a real time display of cardiac cycles is provided, but which does not rely on visual discrimination between abnormal and normal segments of the cardiac response in order to detect abnormal segments.

It is a still further object of the present invention to provide an improved method of and system for recognizing abnormal segments of a cardiac response and to provide a permanent electrocardiogram of such abnormal segments without any significant number of normal segments included in the electrocardiogram.

It is a still further object of the present invention to provide an improved means for the detection of cardiac arrhythmias.

It is a still further object of the present invention to provide improved apparatus for control of electrocardiogram recorders.

It is a still further object of the present invention to provide an improved system for remote monitoring of electrocardiographic (ECG) signals.

It is a still further object of the present invention to provide an improved system for recording of ECG signals.

It is a still further object of the present invention to provide an improved system for playback of ECG signals.

It is a still further object of the present invention to provide an improved digital data processing system for ECG signals.

It is a still further object of the present invention to provide an improved system for a digital processing of an ECG signal so as to obtain data which characterizes signals representing certain arrhythmias and which discriminates among different arrhythmias (e.g., bradycardia, tachycardia, arrhythmias, fibrillation, sinus arrest, bigeminy, and trigeminy).

Briefly described, the method and system for processing of physiological information in accordance with the invention comprises detecting electrical signals which represent the physiological events. These signals are then translated into control signals which correspond to the physiological events of interest. Preferably the signals are translated into digital form for processing and the control signals result from such digital processing. The control signals are then utilized to enable the operation of a recorder which provides a permanent record or hard copy readout of the signals themselves. Thus, only those portions of the signals which characterize the physiological events of interest are recorded. The system operates automatically to both detect, process and record the physiological events of interest.

In accordance with a feature of the invention a time code is generated concurrently with the physiological events signal. The control signals then enable the recording of the time code simultaneously with the record of the physiological events of interest. Thus, the physiological events and their time of occurrence are correlated with each other in accordance with the invention.

In accordance with still another feature of the invention a digital printer is provided. Digital signals resulting from processing of the physiological signals are encoded during certain intervals of time established by the time code into digital codes which are printed by printer so as to provide a numeric as well as a graphic readout of the physiological events.

An oscilloscope (CRT) may also be provided so that a real time display of the physiological signals may be observed. This oscilloscope display in ancillary to the automatic processing of the physiological signals so as to provide the graphic recording thereof. Features of the processing of the physiological signals to obtain the control signals include systems of and methods for detecting the occurrence of predetermined portions of successive cycles of the signals and providing the control signals when such portions occur earlier or later than predetermined intervals of time. Control signals may also be provided when the difference between the intervals of time as separate successive pairs of such portions fall outside of certain periods or when the ratio which these intervals bear to each other exceeds a certain value. The limits and the values are adjustable whereby the number of control signals and the amount of physiological information recorded can be controlled.

The invention itself as well as the foregoing and other objects, features and advantages thereof, will be more clearly understood from the following description when taken in connection with the accompanying drawings in which:

FIG. 1 is a simplified block diagram of an electrocardiograph system which embodies the invention;

FIG. 2 is a diagram, partially in block and partially in schematic form, of the ECG sensor unit shown in FIG. 1 which provides for remote pick-up of ECG signals;

FIG. 3 is a block diagram of the record unit shown in FIG. 1 which is adapted to cooperate with the remote transmission unit shown in FIG. 2 over the radio link shown in FIG. 1;

FIG. 11A is a simplified wave-form diagram illustrating the operation of the output system shown in FIG. 11 in discriminating amongst various types of arrhythmias;

FIG. 12 is a block diagram of another arrhythmia detector unit which is included in the arrhythmia detectors of FIG. 7 and the output from which is selected by means of the output system shown in FIG. 11;

Figure 4:
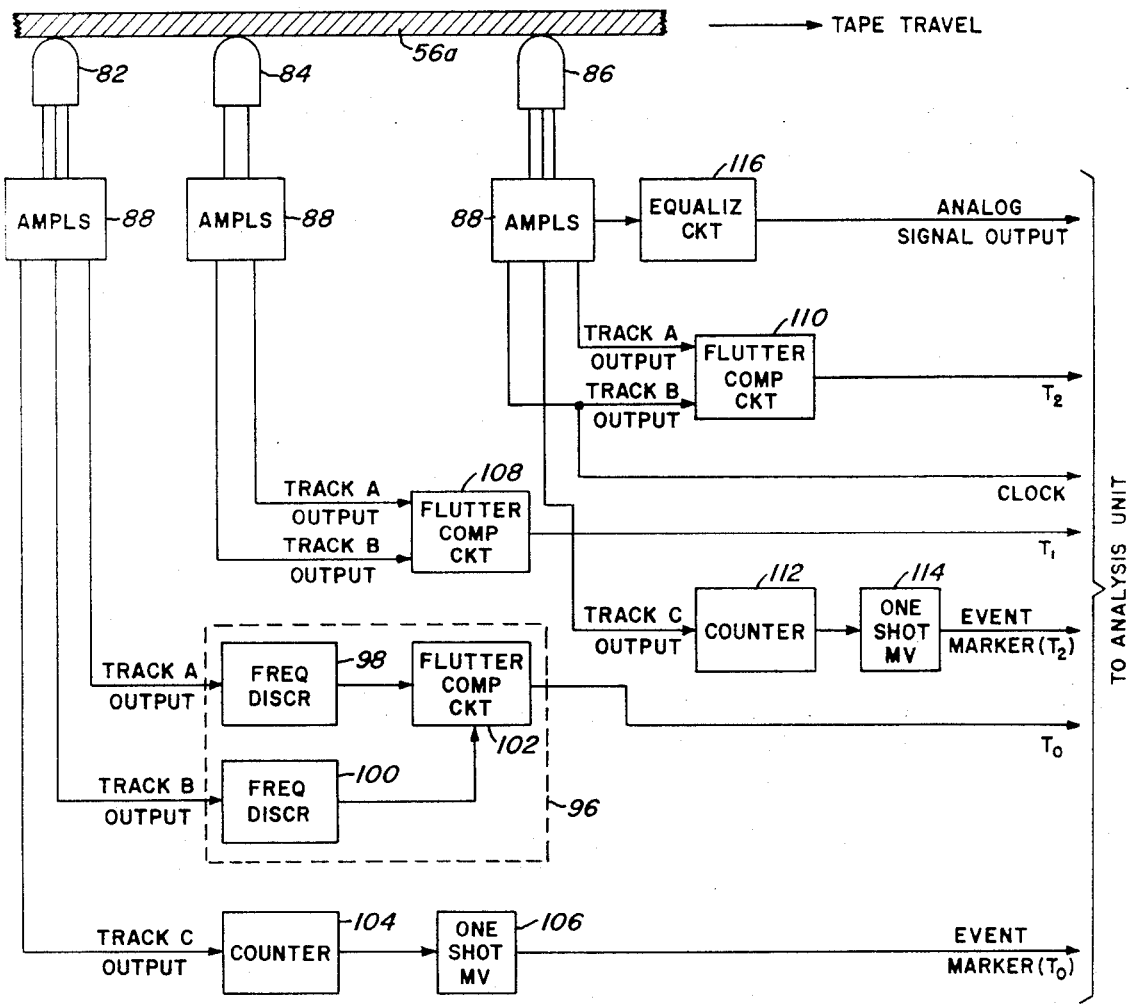
FIG. 4 is a block diagram of the playback unit shown in FIG. 1.

Referring to FIG. 1, there is shown an system embodying the invention which is especially adapted for providing long-term electrocardiographic recordings and then analyzing the recorded data by playing back and processing the recorded electrocardiograph (ECG) signals. The system permits a continuous uninterrupted 24-hour, electrocardiographic magnetic tape recording of an active ambulatory subject. In addition, an accurate time signal or code is also recorded so that the time of day of significant events may be obtained.

The system includes an ECG sensor unit 10 which preferably is a FM radio transmitter. As shown in FIG. 2 the unit includes a pair of electrodes 12 and 14 which are attached to the body of the patient, the leads from the electrodes are connected by way of isolating resistors 16 and 18 to the input of a FM-FM modulator 20. The ECG signals from the electrodes are used to modulate a first carrier then the modulated carrier is used to modulate a second higher frequency carrier. The first carrier may be in the audio band, say 6,000 Hz, and the second carrier may be in the UHF band, say 200 MHz. The output of the modulator is amplified in a radio-frequency amplifier 22. The antenna system utilizes the electrode leads. Specifically, the lead to the electrode 12 is further isolated for radio frequencies by a choke 24. Low frequency and DC isolation for the output of the amplifier 22 is provided by the capacitor 26. Thus, both the low frequency electrocardiograph signals and the high frequency radio frequency signals both use the lead from the electrode 12. The system therefore provides an efficient self-contained antenna system. Of course the entire transmitter unit may be battery operated and miniaturized so as to be carried easily by the subject throughout his daily activities.

Returning now to FIG. 1, the output of the transmitter and the sensor unit 10 travels by way of a radio link 28 to a recording unit 30. The receiving end of the radio link may be in the same cabinet as the recording unit and contains a pick-up antenna 32 as shown in FIG. 3. The antenna is connected to the input of a receiver of the super-heterodyne type. This receiver contains a RF amplifier 34, and a frequency translator or mixer 36 which is supplied with injected signals from a local oscillator or oscillators 38. Twin injections to the translator 36 are preferred so that the receiver is of the double-conversion type for better sensitivity. The output of the translator is at intermediate frequency, say approximately 11 MHz.

After amplification in an intermediate frequency amplifier 40 the output is demodulated to the first carrier frequency (about 6,000 Hz) in a frequency discriminator 42. It is a feature of this invention that a FM signal is recorded in the record unit 30. This is accomplished, also in accordance with the invention, by simultaneously recording a timing track on the same record medium as the FM ECG signals. The timing track is utilized for the generation of a time code as will be explained more fully hereinafter. Desirably, the recording is made at relatively slow speed as compared to speeds used in conventional recordings so as to efficiently utilize the record medium. A suitable recording speed is 15 inches per minute. A suitable recording medium is magnetic tape. A FM signal is especially desirable for tape recording at the slow speed since essentially saturation recording can be used, which provides more accurate recording without the need for equalization or compensation circuits. Because of the slow speeds it is desirable to record at lower than the 6,000 Hz carrier frequency. To this end, and also for flutter compensation purposes on playback, a frequency standard oscillator which is desirably a crystal oscillator 44 is utilized. Frequency dividers 46 are used to count down the oscillator 44 frequency to provide an injected signal to a mixer 48.

The injection into the mixer 48 produces a FM signal having a carrier frequency say of approximately 600 Hz which is then divided, say by two, in a divider 50, to provide a center frequency of the FM recording signal of 300 Hz. The signal is amplified in a record drive amplifier 52 and then applied to the recording head 54 which records a first or upper track A on the tape 56. The frequency dividers 46 also provide a constant frequency timing signal at the same frequency as the FM carrier (300 Hz) which is applied to a record amplifier 58 and then recorded on track B which is in line along the same line transverse to the tape. The head 60 then records the second track B.

It is also desirable to record an event code on the tape. To this end, a portion of the timing signal (300 Hz) is applied via an event marker switch, such as a push-button switch 62, through a record amplifier 64 to a third head 66 which is in line with the other heads 54 and 60. The switch 62 may be located at the record unit 30. In such event the event marker may simply be recorded by the subject coming over to the record unit and pressing the switch whenever he believes a significant event is taking place, say for example, irregular heart beat, skipped beats, or the like. Alternatively, a means may be provided for remote actuation of the event marker. In that event, the event marker switch 62 may be radio controlled by a separate channel in the transmitter unit (e.g., a separate oscillator, modulated to a different frequency which is detected by a separate event marker channel receiver). Other forms of remote actuation may of course be used.

Facilities are also provided for recording other signals on a fourth track by way of another head 68 which records on this fourth track D. Such analog signal inputs as a voice commentary, an electroencephalograph (EEG) signal, respiration or blood pressure sensor output, may be the analog signal input. A conventional analog recording technique may be used involving a record amplifier 76 and a source 78 of bias oscillation therefor. D.C. bias may be used. Of course, FM recording may be utilized.

The recording is made desirably over a long time period, such as up to 24 or 25 hours, during which the subject carries on his normal activities. This continuous long-term recording may also be made during certain times when the subject carries out various diagnostic procedures, for example, exercises, such as running on a treadmill, and otherwise when his cardiac capacity is placed under stress. In such event the event marker may be utilized and actuated in such a way that the periods of stress are indicated. The event marker may also be utilized to indicate a precise time of day for subsequent time calibration.

The system illustrated in FIG. 1 also includes a playback unit 80. The records are desirably played back on this unit at a much faster rate than the rate at which they were recorded. This is accomplished for a time compression purposes and utilize the facilities of the system to process data at a rapid rate, for example the play back speed may be 60 times the record speed or 15 inches per second when the record speed is 15 inches per minute.

Referring to FIG. 4, the tape indicated at 56a, since it may be the same tape as is recorded on the record unit 30 or some other tape is wound in the direction indicated by the arrow labeled "tape travel" so that it passes three heads 82, 84 and 86 in the order named. The head 82 has three head units which scan tracks A, B and C. The second head 84 need only have two head units which scan tracks A and B. The third head 86, similarly with the first head 82 scans three tracks A, B and C and has a head unit for scanning track D. The spacing between heads 82 and 84 is closer than the spacing between heads 84 and 86, so as to provide successively greater time delays in the pickup of the signals from the time they are picked up by head 84 to the time they are picked up by head 86. The head 82 outputs are indicated as being provided at time $T_o$ with the heads 84 and 86 providing their outputs at times $T_1$ and $T_2$ respectively. The outputs from the heads are amplified, each head unit having its respective amplifiers 88.

The track A and track B outputs from the head 82 are applied to a flutter compensation circuit 96 which also serves to demodulate the FM ECG signal recorded on the tape thereby providing an output ECG signal in analog form. The flutter compensation circuit includes two similar frequency discriminators 98 and 100. The frequency discriminator 98 demodulates the track A output to provide the ECG signal to which any flutter, which of course appears as a FM signal, as a modulation component on the output from the frequency discriminator 98. The track B output is a pure tone at the same frequency as the center frequency or carrier frequency of the FM signal from track A. The flutter component of the track B signal will be demodulated to provide the same spurious modulation component as the signals from the track A discrminator 98. When additively combined in opposite phase in a flutter compensating circuit 102, which may be a difference amplifier, the spurious flutter components cancel so as to provide an accurate and stable ECG signal at the output indicated as at $T_o$.

The track C output from the first head 82 contains the event marker. This output will be in the form of a series of pulses in order to discriminate against inadvertent closure of the switch, or a noise on the tape, which may manifest itself as by pulses, a counter 104 is used as a noise filter. The counter may also contain a reset circuit which automatically re-sets the counter periodically. When the counter reaches a predetermined count (for example a count of 8) a one-shot multivibrator 106 is triggered which produces an event marker pulse.

The second head 84 also includes a discriminator and flutter compensation circuit 108 similar to the circuit 96 and produces an ECG signal at the $T_1$ output.

The third head 86 has track A and track B outputs similar to the heads 82 and 84 and produces the ECG signal at $T_2$ after flutter compensation in circuit indicated at 110.

A track C output from the head 86 is applied to a counter 112 and one shot 114 similar to the counter 104 and one shot 106, and produces a delayed event marker pulse at $T_2$. The timing track B is also used as a clock track for generating the time code which was mentioned above, and will be explained more fully hereinafter. This clock track signal will be a sequence of pulses which in this illustrated example has a frequency of 300 Hz, multiplied by the frequency multiplication factor due to the increased speed of tape travel. Assuming an increase in speed of sixty times, the clock pulse frequency will be 18,000 Hz.

Track D from the head 86 is amplified in its amplifiers 88, passed through an equalizing circuit 116 to produce the analog signal output again multiplied in frequency. The analog signal output, if an audio signal, must be time expanded by a dynamic delay means such as a tape loop running at slow speed from which selected analog signals can be obtained at lower speeds (viz., their input frequencies). Additional head units may be provided as part of heads 82 and 84 to scan track D so as to recover relatively time delayed signals. If FM recording techniques are utilized, the equalizing circuit 116 is not required. The foregoing magnetic and FM recording techniques are conventional in the art and are therefore not discussed in detail herein.

Returning now to FIG. 1, the outputs of the playback unit, which are shown in detail in FIG. 4 are applied to an analysis unit 120. This unit is operative to process the physiological information, which in this illustrative embodiment of the invention is electrocardiographic information, and to provide control signals as well as ECG signals themselves to the displays and the print-out units 122 of the system. The analysis unit 120 processes the information contained in the ECG signals, both on an analog and on a digital basis, to obtain a digital control signal which enable the display recording and print-out of selected physiological events. In this illustrative embodiment of the invention, the events are the dysrhythmias or arrhythmias which characterize cardiac abnormalities. The assemblies and subassemblies which constitute the analysis unit 120 and the display and print-out units 122 will be described hereinafter.

Figure 6:
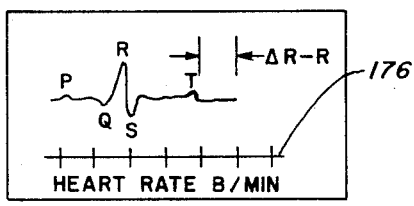
FIG. 6 is an enlarged representation of an ECG display which is obtainable with the portion of the system shown in FIG. 5.

For a better understanding of the operation of the analysis unit 120 and the displays and print-out units 122 consider the electrical pattern or waveform of the cardiac cycle which is illustrated in FIG. 6.

The electrical activity during the cardiac cycle which is obtained by the sensor unit 10 at the electrodes 12 and 14 (see FIG. 2) may be characterized by five principal waves or deflections which are arbitrarily designated as P,Q,R,S and T. The significance of the waves as presently understood by medical authority (it should be understood that the invention is not intended to be limited to any particular understanding of the significance of these waves or their designations) is as follows: The P wave represents the electrical activity associated with the original impulse from the SA or sinoatrial node and its subsequent propagation through the atria. The QRS complex consists of an initial downward deflection (in the normal case) which is the Q wave, a large upward deflection (the R wave) and a second downward deflection (the S wave). Prior to the QRS complex there is an interval (the PR interval) from the start of the P wave to the beginning of the QRS complex. This interval represents the time taken by the original impulse to reach the ventricles and initiate ventricular depolarization. During this PR interval the impulse has traversed the atria and the atrioventricular (AV) node. The QRS complex thus reflects the time necessary for the impulse to spread from the AV node through the Bundle of His and its branches to complete ventricular activations. The R wave is the electronically most discernible wave of the cardiac cycle.

After the QRS complex there exists an interval known as the ST segment which represents the period between the completion of depolarization (contraction) and repolarization (recovery) of the ventricular muscles. The T wave represents the recovery phase after contraction. The normal electrocardiogram consists of a repetitive series of P,Q,R,S and T waves which conform to established standards for size and shape and occur, say, from 60 to 100 times each minute. If these conditions prevail, the heart is said to be in normal sinus rhythm. Dysrhythmia connotes abnormalities in the rate or shape of any of the portions of the waveform. Dysrhythmia is also called arrhythmia and either term is used herein to describe all forms of abnormality of the heart beat including abnormalities in rate, rhythm, and in condition times through the heart for the cardiac impulses.

Figure 7:
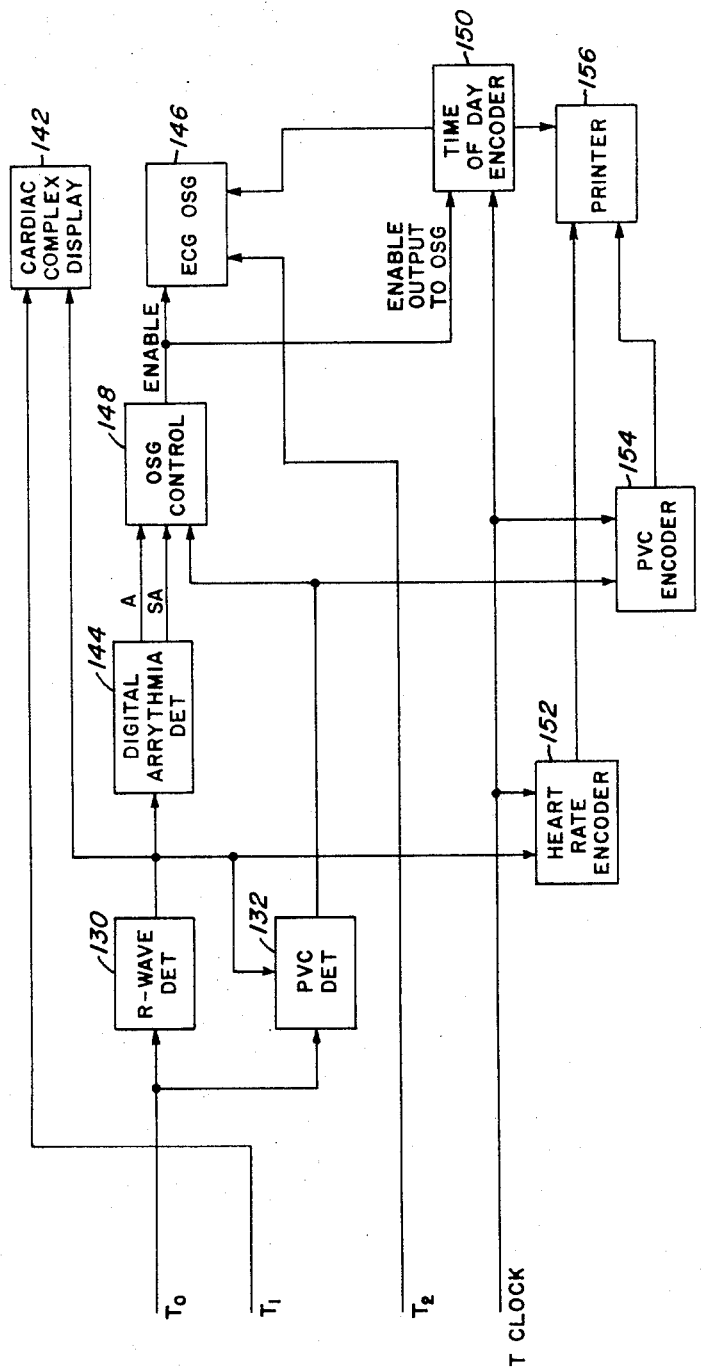
FIG. 7 is a simplified block diagram showing portions of the analysis unit depicted in FIG. 1, together with an ECG oscillograph recorder and digital printer which provides the print-out units depicted in FIG. 1.

Referring now to FIG. 7, the ECG signal, $T_o$, is applied first to a R wave detector 130. The R wave detector is a pulse detector which discriminates the R wave from the other waves of the cardiac cycle. It contains a filter adapted to pass signals having frequency spectra from approximately 600 to 2,400 Hz, which is the band in which the frequency multiplied R wave lies in this example. These filters are preferably active filters which also amplify the R wave. After amplification, the R wave is discriminated and threshold detected so as to discern it on an amplitude basis from the other waves of the cycle and from artifacts. A pulse-forming circuit which may be part of the threshold detector provides a pulse synchronous with the R wave at the output of the detector 130. While R wave detectors having the components just described are preferred, other R wave detectors which produce a pulse upon occurrence of the R wave in the cardiac cycles may be used, such as a digital processing detector which seeks out certain signal parameters (for example, the definitive rate of downslope from R to S).

The analysis unit also includes a premature ventricular contraction (PVC) detector 132. The PVC is characterized by a peculiar ECG wave form usually having a short interval between successive R waves (R—R interval) followed by a compensatory pause, prolonged duration of the QRS complex and postextrasystolic T-wave change (the T wave usually going in a reversed direction). The PVC detector, briefly described, is an electronic filter responsive to the PVC waveform. The electrocardiographic waveform and the output of the R wave detector are applied to the PVC detector 132 so as to permit recognition of PVC events upon each cardiac cycle.

Figure 16:
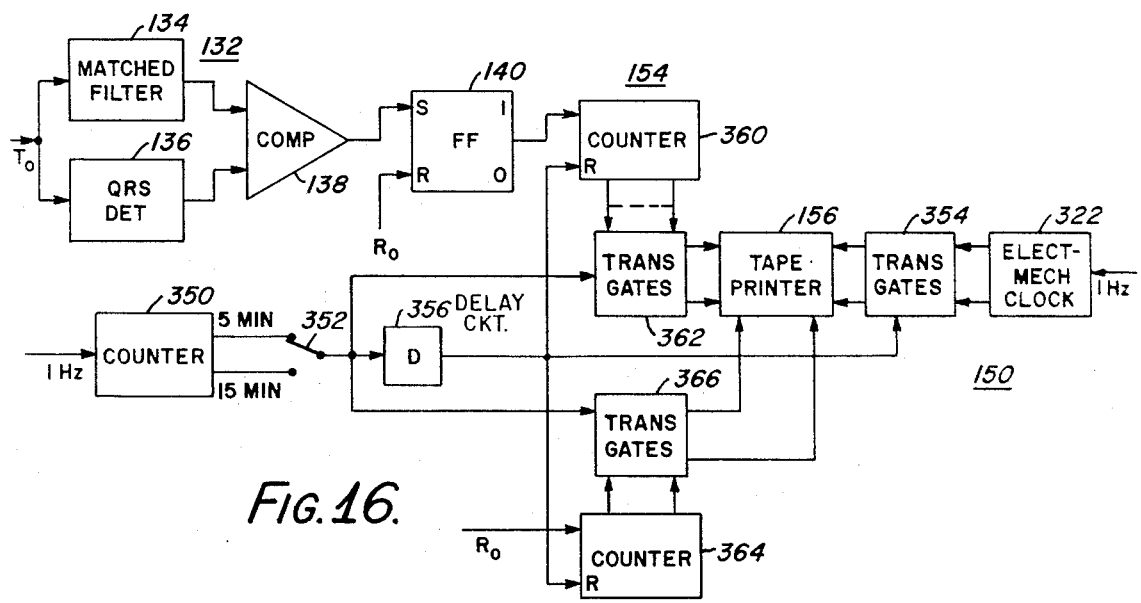
FIG. 16 is a block diagram illustrating the PVC detector, heart-rate encoder and PVC encoder, together with the printer, all of which are also depicted in FIG. 7.

The PVC detector is shown in greater detail in FIG. 16, as being made up of a matched filter 134 and a QRS detector 136. The matched filter includes a plurality of tandem active filter stages, each stage being matched to a successive portion of the before described PVC waveform. The matched filter then provides an output level having an amplitude proportional to the degree of match of the input waveform of the ECG signal to the waveform to which the filter 134 is matched. The QRS detector 136 is a threshold circuit which provides an output level depending upon the duration of the QRS interval. A comparator 138 provides an output pulse when the output level of the matched filter 134 and the QRS detector 136 are within a predetermined range which connotes the existence of the PVC waveform and the deformed QRS interval duration which characterizes the PVC condition. The output of the comparator 138 is a pulse which sets flip-flop 140. This flip-flop is re-set by the R wave detector 130 output pulse so that the existence of PVC's can be detected on each cardiac cycle.

A cardiac complex disply 142 (FIG. 7) consists of an oscilloscope (CRT) display. The oscilloscope is synchronized by the output of the R wave detector. The delayed ECG signal at time $T_1$ is applied to the oscilloscope so as to permit the individual complexes as shown in FIG. 6 to appear as a single relatively stable wave on the screen on the oscilloscope's cathode ray tube. The oscilloscope display 142 will be described in greater deail in connection with FIG. 5.

The analysis unit also includes a digital arrhythmia detector which processes the digital information represented by the output pulse, which is a digital bit, from the R wave detector 130. The arrhythmia detector 144, by processing the R wave information detects and identifies R wave dependent arrhythmias. Such arrhythmias include arrhythmias dependent on a change in duration of the interval between certain portions of the waves of successive cardiac cycles, specifically the R waves in this illustrative embodiment of the invention (viz., the R—R interval). These arrhythmias include all tachycardia and bradycardia dysrhythmias, premature contractions, fibrillations and arrests. The output of the detector are indicated at A and SA. The output SA connotes the detection of a sinus arrest in a cardiac cycle and the output A connotes the detection of a dysrhythmia or arrhythmia in a cardiac cycle. The digital arrhythmia detector 144 therefore provides control signals which accomplish data reduction by recognizing and eliminating normal cycles and complexes and detecting and alarming only for the abnormal sequences. If, for example, one hundred instances of abnormality occur in a given 24-hour recording, the detector will automatically detect and provide control signals in response to these 100 events. The number of complexes to be reviewed by a trained cardiologist is now reduced electronically to a much smaller number, say 500 (assuming some of the cycles on either side of the cycles having the cardiac events are desired) which the human eye can rapidly identify, pattern recognize and diagnose for heart diseases and dysfunctions of the heart. Inasmuch as the data is processed at several times (say 60 times) faster than the time required to make the initial record, the tedious, eye tiring, and inaccurate technique of conventional systems, say systems which rely on review by a trained cardiologist of an oscilloscope display alone, is eliminated. Such faster than real time processing is referred to hereinafter as "greater than real time" processing.

The digital arrhythmia detector 144 recognizes potential arrhythmias in two ways, first whenever each R—R interval is shorter than a predetermined duration, or is longer than that predetermined duration, which duration can be selectively adjusted, and secondly by the relationship of successive pairs of R—R intervals. An R—R interval which is shorter or longer than its preceding R—R interval by a given proportion is then identified as a potential abnormality or arrhythmia.

The degree of difference in R—R intervals is also adjustable, say from five to forty percent; that is to say if the succeeding R—R interval is longer or shorter than its immediately preceding interval by a percentage from five to forty percent as selected by the operator, an alarm output is produced.

The system includes a direct recording ECG oscillograph 146. This oscillograph includes an ECG galvanometer for recording on three separate tracks on a record medium such as a paper which is advanced by a drive motor at a constant speed upon enabling command. The system has facilities for enabling the recording of only selected complexes upon occurrence of the control signals from the arrhythmia detector 144, or from the PVC detector 132. These control signals are translated into oscillograph operating signals by an oscillograph control system 148. The galvanometer signals for the oscillograph are obtained from the last head which produces the ECG signals at time $T_2$. In order to identify the time of day when these ECG signals are produced, the clock track $T_{clock}$ is applied to a time-of-day encoder 150 which produces a serial digital code which is recorded concurrently with the electrocardiogram of the complexes on another track on the oscillograph paper.

To this end the oscillograph control 148 produces an enabling signal after a requisite time delay to accommodate the time delay of the ECG signals at $T_2$ to reach the oscillograph 146. The control of the oscillograph is then concurrent with the application to the oscillograph of the ECG signals corresponding to the ECG complexes which gave rise to the control signals (e.g., the PVC, SA or A signals). The enable signal from the oscillograph control 148 is applied to the ECG oscillograph and first starts the drive motor. After a short time, when the paper is up to speed, the oscillograph galvanometer is enabled to receive the ECG signals at $T_2$. These signals are then recorded on the paper. At the same time, the time-of-day encoder is enabled and produces a time-of-day code which is recorded by the oscillograph recorder concurrently with the ECG signals. Preferably a plurality of cycles both succeeding and preceding the complexes which result in the A and SA or PVC control signals are recorded. The cardiologist then has a data reduction facility by virtue of the system which obtains only the electrocardiograms of the significant event (viz., the arrhythmias and PVC's which are primarily useful in diagnosing heart defects).

The time clock signal is also applied to a heart rate encoder 152 and a PVC encoder 154. These encoders are similar in circuitry. The R wave bits are applied to the heart rate encoder where they are counted for predetermined periods of time, say every 5 minutes or 15 minutes of recording as represented by the clock signals. Then an output in terms of R waves per minute or PVC's per minute is encoded into a serial code which is applied to a digital printer 156. The printer may have a third channel which directly encodes the time clock into codes representing 5 minute or 15 minute intervals. Thus, three numerical print-outs are provided, as well as the hard copy oscillogram from the oscillograph, 146; these being heart rate per interval, PVC's per interval, and the exact time of day of each of these intervals.

Figure 5:
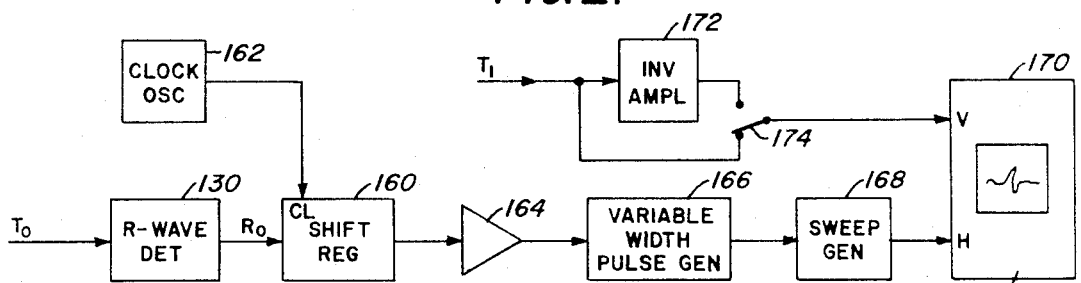
FIG. 5 is a block diagram showing a portion of the analysis unit and an ECG display in accordance with the invention.

Referring now to FIG. 5 there is shown the synchronized ECG oscilloscopic display provided in accordance with the invention. The R wave detector 130 which responds to the ECG signal at $T_0$ produces the digital outputs $R_o$ upon occurrence, of each R wave of each cardiac cycle. These $R_o$ bits are applied to the input of a storage means such as a dynamic storage means in the form of a shift register 160. A clock oscillator 162 provides shift pulses to the clock input of the register 160. These shift pulses desirably having a repetition rate of 100 times the repetition rate of the $R_o$ bits (for $R_o$ bits having an average rate of 60 Hz, a clock oscillator frequency of 6 KHz is suitable). The shift register has sufficient stages to introduce a delay of the $R_o$ signals approximately equal to the delay of the ECG signals from time $T_0$ to $T_1$. The shift register output is passed through a buffer amplifier 164 and thence to a variable width pulse generator 167. The lagging edge of the pulse from the generator is adjustable by a control available to the operator so as to provide fine adjustment in the delay of each $R_o$ pulse. The lagging edge of the pulse generator output is utilized to control the duration of a saw-tooth wave or sweep produced by a sweep generator 168. The sweep generator is desirably a saw-tooth generator, such as an integrating circuit having an integration period which terminates and then restarts upon the lagging edge of each pulse from the pulse generator 166.

The sweep is applied to the horizontal deflection input terminals of the oscilloscope. The ECG signal at time $T_1$ is applied to the vertical deflection input of the oscilloscope 170. An inverting amplifier 172 and a switch 174 is provided in order to invert the polarity of the display so as to provide the R wave in the positive going direction, as is conventional.

The tracing on the scope begins before the P wave and each individual P-QRS-T complex is displayed as shown in FIG. 6. Inasmuch as the sweep duration is proportional to the heart rate, the heart rate can be read from a scale 176 shown in FIG. 6 immediately below the complex (viz., the length of the complex is a function of the length of the cardiac cycle and therefore the heart rate). Variations in the heart rate appear as a change in the length of the diastolic period which are indicated by the dash lines as R—R. The single complexes are individually displayed. A direct reading of heart rate is presented, and differences in duration of the complexes on a beat-to-beat basis is presented by the length of the interval after the T wave.

Figure 8:
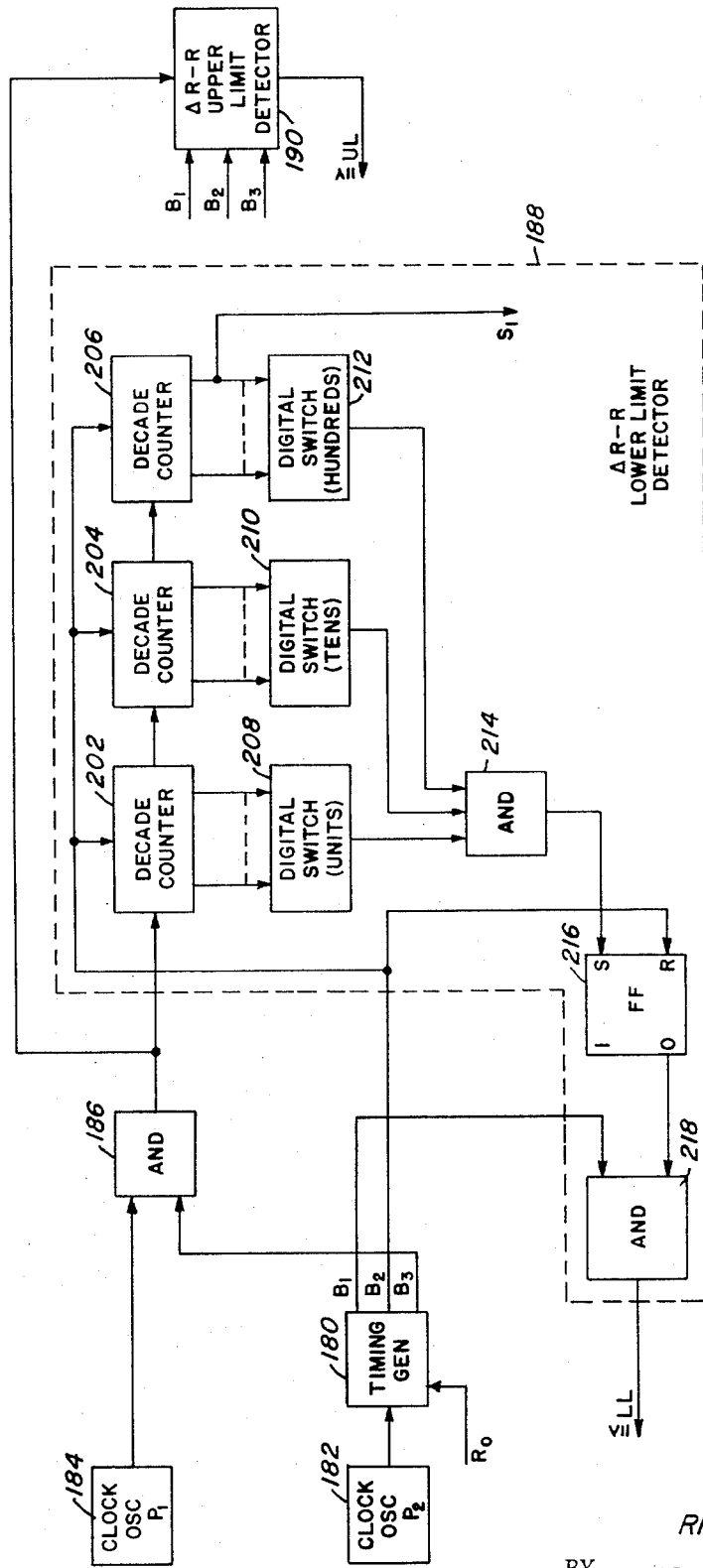
FIG. 8 is a more detailed block diagram showing an arrhythmia detector unit embodying the invention, which unit is incorporated in the digital arrhythmia detector shown in FIG. 7.

One of the digital arrhythmia detectors is shown in FIG. 8. This detector provides control signal outputs whenever the interval between successive R waves (the ΔR—R interval) is below or above the upper or lower limits of an interval, the limits being adjustable by the operator. To this end the detector includes a timing generator 180 to which the $R_o$ bits and clock pulses from a clock oscillator 182 having a pulse repetition rate indicated as $P_2$ are applied. Another clock oscillator 184 having a repetition rate of its output pulses of $P_1$ is also provided. In order that the time limits may be presented in decimal format the clock oscillator 184 desirably has a repetition rate $P_1$ of 10 KHz. The other clock oscillator 182 repetition rate is desirably an order of magnitude higher than $P_1$. The timing generator produces three separate timing pulse outputs $B_1$, $B_2$, $B_3$. These pulses and their corresponding $R_o$ bits are shown in FIG. 9A. The $B_3$ pulses enable and and gate 186, when present, to apply the $P_1$ pulses to a lower limit detector 188 and an upper limit detector 180. The control signals produced by these detectors are indicated at the outputs of these detectors 188, and 190 as equal or less than LL and equal or greater than UL. Thus, control signal outputs are provided when the ΔR—R intervals are below or above the lower and upper limits of a certain interval.

Figure 9:
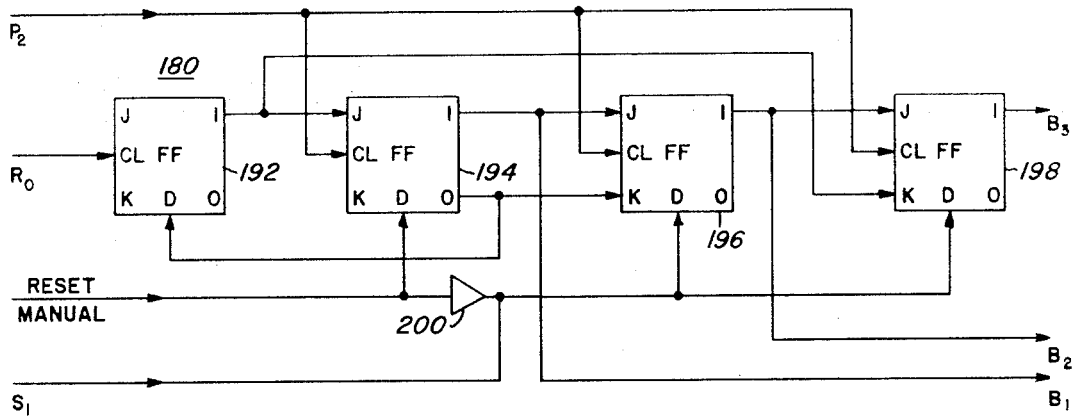
FIG. 9 is a still more detailed block diagram of the timing generator shown in FIG. 8.
Figure 9A:
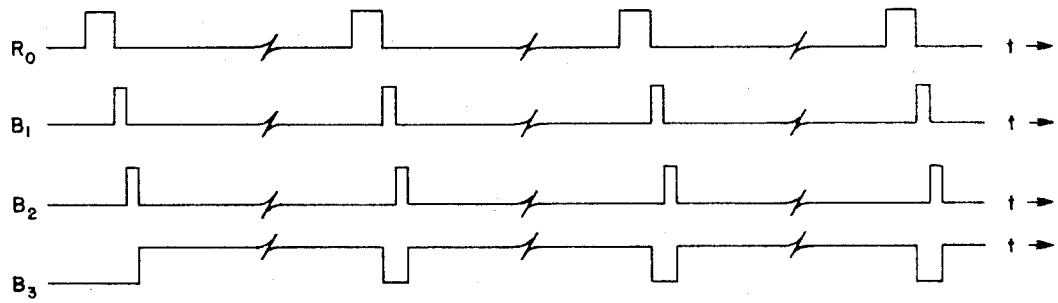
FIG. 9A is a wave-form diagram depicting some of the wave forms produced by the timing generator shown in FIG. 9.

The timing generator 180 is shown in greater detail in FIG. 9. It includes three tandem connected flip-flops of the JK type 192, 194, 196 and 198. The $R_o$ bit is applied to the clock input of the flip-flop 192 and sets that flip-flop. The second flip-flop 194 is then enabled to be set. The last flip-flop 198 is also then enabled to be re-set; it has however, already been re-set at the start of operation by a manual re-set from the front panel which is operated automatically when the start or power-on switch is depressed for the entire system. A buffer amplifier 200 is provided for isolation of the re-set or D inputs of the flip-flops from an $S_1$ input to the timing generator. $S_1$ represents a sinus arrest condition to be discussed hereinafter.

The next high frequency $P_2$ clock pulse then sets the second flip-flop 194. The immediately succeeding $P_2$ pulse causes the flip-flop 194 to be re-set, thereby producing a short $B_1$ pulse immediately subsequent to the $R_o$ pulse as shown in FIG. 9A. The second $P_2$ clock pulse also causes the second flip-flop 194 to be re-set which thereupon re-sets the first flip-flop 192.

During the second $P_2$ clock pulse interval, the third flip-flop 196 is enabled to be set. Accordingly, when the third $P_2$ pulse arrives at the clock input of the third flip-flop that flip-flop is set. The third $P_2$ pulse causes the second flip-flop 194 to become re-set; thus the third flip-flop 196 re-sets on the fourth $P_2$ pulse. During this short interval of time (viz., the interval of the third $P_2$ pulse), the timing pulse $B_2$ is produced.

The fourth flip-flop 198 is enabled to be set during the third $P_2$ pulse interval, when the third flip-flop 196 is set. The fourth $P_2$ clock pulse then sets the fourth flip-flop 198 This fourth flip-flop remains set to produce the $B_3$ output until the lagging edge of the next $R_o$ bit which again sets the first flip-flop 192, thereby enabling the fourth flip-flop 198 to be reset by the $P_2$ clock pulse immediately succeeding the next $R_o$ bit lagging edge. The $S_1$ bit automatically re-sets the third and fourth flip-flops 196 and 198, thereby precluding the generation of the $B_2$ and $B_3$ pulses.

$B_3$ enables the gate 116 (FIG. 8) which allows the passage of the $P_1$ clock pulses to the first of a string of three-decade counters 202, 204 and 206 of the low-limit detector 188. Digital switches 208, 210 and 212, which are connected to the stages of the units counter 202, the tens counter 204 and the hundreds counter 206, selectively connect different stages of these counters to an and gate 214. The digital switches may be accessible at the front panel of the systems, and may be thumb wheel switches which are controlled by the operator to adjust the lower limit. Thus, when the counters reach a certain count as established by these switches, the switches provide outputs which enable the gate 214 to set a flip-flop 216. If a count in excess of the number displayed on the switches 208, 210 and 212 is reached, therefore, the flip-flop 216 is set. If this count is not reached during the period of each $B_3$ pulse, the flip-flop 216 is not set. The zero output of the flip-flop 216, if high, connotes that the flip-flop 216 is not set and thus enables an and gate 218.

At the end of each cardiac cycle, the pulse $B_3$ terminates (viz., the length of $B_3$ is equal to the length of the R—R interval). The $B_1$ pulse then appears which enables the and gate 218 and thus checks the lower limit to provide a low limit output when, and only when the lower limit is not exceeded. This output then connotes an arrhythmia. The $B_2$ timing pulse is operative to reset the flip-flop 216 and the counters 202, 204 and 206 so as to prepare them for the next cardiac cycle.

The upper limit detector 190 is similar to the lower limit detector 188 and provides an output when and only when the upper limit is exceeded.

Figure 10:
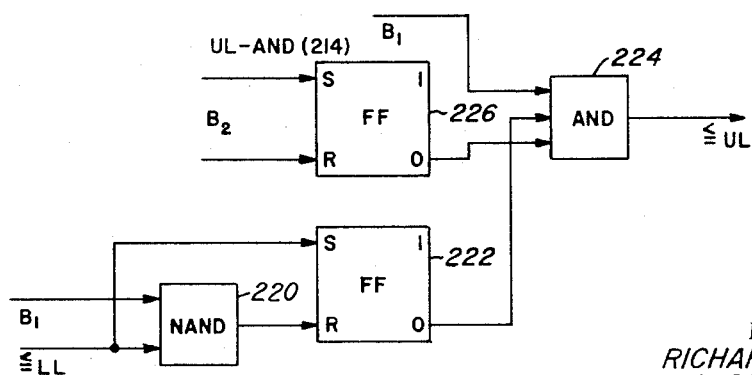
FIG. 10 is a more detailed block diagram showing the output circuits of the upper limit detector shown in FIG. 8.

For reasons related to the elimination of redundant data which will be discussed hereinafter, the circuitry of FIG. 10 is provided. In this circuitry a NAND gate 220 receives the $B_1$ timing signal and the lower limit detector output. The lower limit detector output, when it is produced upon occurrence of the $B_1$ pulse, sets a flip-flop 222. The flip-flop 222 is re-set by the NAND gate 220 output. Accordingly, if the lower limit output does not appear at the time of the $B_1$ pulse, the flip-flop 222 is re-set. If both the $B_1$ pulse and the lower limit output appear the flip-flop 222 is set. The zero output of the flip-flop then serves to inhibit an AND gate 224 which provides the upper limit output. The other inputs to this AND gate 224 are the $B_1$ timing pulse and the output of a flip-flop 226 which is similar to the flip-flop 216 of the lower limit detector 188.

Returning now to the lower limit detector, the $S_1$ or sinus arrest output is obtained from the last stage of the hundreds-decade counter 206. Thus if the highest stage of the decade counters is set, it connotes that the R-wave has not occurred in a cardiac cycle. This condition indicates a sinus arrest event.

Figure 11:
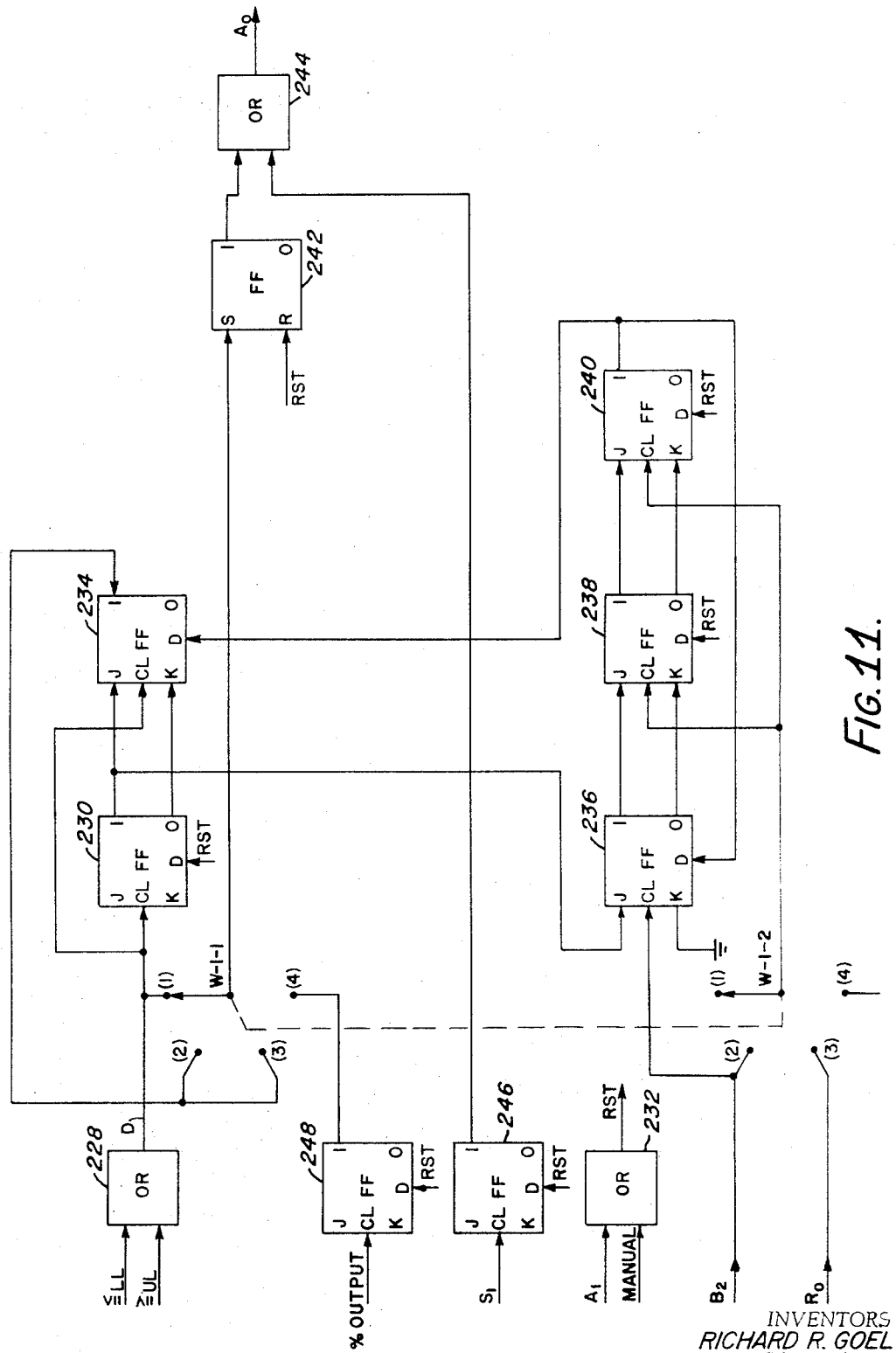
FIG. 11 is a block diagram illustrating the output units of the arrhythmia detector shown in FIG. 7; these units providing for the selective discrimination among various types of arrhythmias.

Referring to FIG. 11 there is shown a portion of the digital arrhythmia detectors which provide the control signal alarm outputs A in a manner to eliminate certain redundant data. In a 24-hour ECG recording, as obtained by playback of the tape record using the playback unit 80 (FIG. 1) there may be numerous redundant data, for example repeated isolated PVC's or premature atrial contractions (PAC's) which may not be of particular interest under certain circumstances but which would however produce a write-out from the oscillograph 126 (FIG. 7) and thereby provide unnecessary amounts of hard copy. The system shown in FIG. 11 is capable of differentiating a single episode of dysrhythmia (for example, an isolated PVC or PAC) from a sustained arrhythmia (for example, a tachycardia).

The system shown in FIG. 11 includes a ganged switch W-1 having two switch sections W-1-1 and W-1-2 each with four positions (1), (2), (3), (4), which may be selected by the operator at the front panel of the equipment. In position (1) all arrhythmias detected by the subsystem shown in FIG. 8 will produce an alarm output. In position (2) isolated single events (for example PVC's or PAC's) will be eliminated, but sustained arrhythmias, fibrillation, sinus arrest, and bigeminy and trigeminy will produce alarm outputs. In position (3) only sustained brady and tachy arrhythmias, fibrillation, and sinus arrest, but not bigeminy or trigeminy, will produce an alarm output. Position (4) is utilized when the output of another arrhythmia detector which will be described hereinafter in connection with FIG. 12 is utilized.

The outputs of the upper limit detector and lower limit detector 190 and 188 (FIG. 8) are connected to an OR gate 228 directly to the clock input of a JK flip-flop 230. This flip-flop as well as most of the other flip-flops in the system are re-set by an input indicated as RST which is derived from an OR gate 232. The OR gate 232 receives a manual re-set input from the front panel or automatically receives an $A_1$ input at the end of each cardiac sequence recording time. A cardiac sequence recording time being the time for recording of a complete ECG complex of P,Q,R,S and T waves on the oscillograph 146 (FIG. 7).

The flip-flop 230 is connected in tandem with a second flip-flop 234 in a first chain or channel. Another flip-flop chain or channel includes three tandem connected JK flip-flops 236, 238 and 240. These flip-flop chains are utilized only in the second and third positions of the switch $W_1$. In the first position the OR gate 228 output (viz., either a lower or upper limit output) is applied to a flip-flop 242 which sets that flip-flop. The flip-flop 242 remains re-set at least for a cardiac complex oscillograph recording sequence and provides during the time of such sequence the output indicated as $A_o$ via an OR gate 244. It should be noted that the sinus arrest input $S_1$ clocks a triggerable flip-flop 246 in the form of a JK flip-flop which is re-set at the end of the sequence period. Thus sinus arrest always produces an $A_o$ output and provides hard copy from the oscillograph 146 (FIG. 7).

In position (2) of the $W_1$ switch, the output of the OR gate 228 indicated at D (in this connection also refer to FIG. 11A) clocks the flip-flop 230 and enables the second flip-flop 234 to be clocked by the next D output (viz., a lower limit or upper limit output on the next cardiac cycle). Thus in the absence of the second flip-flop 234 being re-set, the second D output sets the second flip-flop 234 which produces an output which passes through the switch W-1-1 to set the flip-flop 242 thereby producing an $A_o$ output which will control and enable the operation of the oscillograph. In position (2) the first flip-flop 236 of the second chain is clocked by the $B_2$ pulses which, as will be observed from FIG. 9A, occur immediately after the lower limit or upper limit outputs are gated out. Thus, if there is a D output, the flip-flop 236 is enabled. The $B_2$ pulse which as is observable from FIG. 9A occurs immediately after the $B_1$ pulse, and therefore immediately after the D pulse sets the first flip-flop 236. This enables the second flip-flop 238 to be set by the $B_2$ pulse on the next cardiac cycle. The third cardiac cycle $B_2$ pulse then enables the third flip-flop 240. Accordingly, if there are three successive cardiac cycles without an intervening D pulse the flip-flop 234 is re-set. Accordingly, the second D pulse must occur within three cardiac cycles or three R wave periods in order to permit the generation of an alarm $A_o$ output. Thus single events such as a single PVC or PAC will not produce an $A_o$ output.

It will be recalled however than an upper limit output following a lower limit output on a preceding cycle is inhibited by the circuit shown in FIG. 10. Thus, on occasions when a short R—R interval is immediately followed by a long R—R interval, no D output will be produced for the second or long interval. This eliminates a single isolated case of PVC. In any event there must be at least two D outputs within three cardiac cycles or R wave intervals in order for an alarm output to be produced when the switch W-1 is set in position (2).

In position (3) of the switch W-1 the $R_o$ bit is applied to the clock inputs of the second and third flip-flops 238 and 240 of the lower chain; the $B_2$ pulse being applied to the clock input of the first flip-flop 236. It is in this third position that bigeminy and trigeminy, which are the conditions shown in FIG. 11A in the second and third pairs of waveforms, are eliminated. Bigeminy and trigeminy are both characterized by short or below lower limits followed by long or above upper limits R-wave intervals. In trigeminy a normal R-wave interval separates succeeding groups of short and long intervals. The circuitry of FIG. 10 eliminates the D pulse due to the long interval which follows a short interval. However, D pulse due to the second successive short interval would cause an output from the last flip-flop 234 of the first chain, unless that flip-flop was re-set. By clocking the second and third flip-flops 238 and 240 of the second chain, with the $R_o$ bit, the second chain is made to count to three (viz., counting one $B_2$ pulse and then the next two $R_o$ pulses) to re-set the second flip-flop 234 in the upper chain prior to the second D pulse.

It will be observed from FIG. 9A that two $R_o$ pulses will precede the second D pulse, but succeed the $B_2$ pulse which clocks the first flip-flop 236 in the lower chain. Accordingly, by virtue of the timing of the pulses provided by the timing generator and the suppression of an upper limit output following immediately a lower limit output, both trigeminy and bigeminy are eliminated in the third position of the $W_1$ switch. It will be observed that a re-set RST pulse from the OR gate 232 is timed to recur at a much slower rate than the maximum of three R-wave intervals over which the redundant data eliminating flip-flop chains shown in FIG. 11 operate.

The fourth position of the $W_1$ switch is allocated to a flip-flop 248 which is operative as a triggerable flip-flop and receives an output from the arrhythmia detector to be described in connection with FIG. 12.

Referring now to FIG. 12, there is shown an arrhythmia detector which recognizes arrhythmia in terms of the ratio which any R-R interval bears to its immediate preceding R—R interval, such that when a succeeding interval is greater or less than its preceding interval by certain percentage, an arrhythmia is detected. Timing signals for the arrhythmia detector shown in FIG. 12 are obtained from the $R_o$ bit. For delay circuits $D_1$ $D_2$, $D_3$ and $D_4$ connected in tandem provide a sequence of timing pulses which occur in rapid succession immediately after each $R_o$ bit. The delay circuits may be one-shot multivibrators. The last timing pulse controls a sweep or saw-tooth generator 250 and synchronizes that generator by stopping the sweep, viz., terminating the saw-tooth and permitting it to initiate the next sweep upon occurrence of the $D_4$ timing pulse.

The output of the sweep generator is a linear voltage increasing in amplitude during the interval between successive $D_4$ timing pulses which of course corresponds to the interval between successive R waves. This linear voltage ramp is passed through a logarithmic amplifier 252 which changes the voltage into the logarithm thereof such that the difference between two succeeding sweep-voltage amplitudes will be proportional to their ratio.

The output of the log amplifier is sampled in one of analog gating circuits 254 and 256. Sampling is controlled by the $D_1$ and $D_2$ timing pulses. The $D_2$ timing pulse operates an electronic switch 262 which may be in the form of a triggerable flip-flop, the output of which alternately enables gates 258 and 260 on alternate $R_o$ bits (viz., on alternate cardiac cycles). When the gate 258 is enabled, the analog gate 254 is enabled. When the gate 260 is enabled the analog gate 256 is enabled. These analog gates 254 and 256 therefore sample the logarithmic amplifier 254 output on alternate cardiac cycles. The sampled outputs are held in hold circuits 264 and 268. Thus the voltage representing the duration of alternate cardiac cycles or alternate R—R wave intervals are applied to the opposite polarized terminals of a difference amplifier 270 which produces an output proportional to the difference therebetween, and therefore an output proportional to the ratio which a first of a succeeding pair of cardiac cycles (R—R intervals) bears to the second interval or cycle of this pair.

A pair of comparator amplifiers 272 and 274 determines whether or not this ratio is above or below a certain limit, of in other words, whether the second interval is greater or less than a certain percentage of the first interval. The upper and lower limit and the percentage are set by a pair of potentiometers 276 and 278 which are respectively connected across reference voltages of opposite polarity. Thus, the comparator 274 will produce an upper limit output pulse if the output of the difference amplifier 270 is above the reference while the comparator 274 produces an output pulse if that difference amplifier output is below the reference. The pulses from the comparators 272 and 274 are passed through an OR gate 280 and are gated out of an AND gate 282 on each cardiac cycle by the $D_3$ timing pulse; the comparator amplifiers being held for the period of a cardiac cycle by the hold circuits 264 and 268. The AND gate 282 therefore produces a pulse indicated as the percent (%) output if the difference in the intervals as expressed in terms of a percent which the second interval bears to the first, is exceeded. Adjustment of the potentiometers 276 and 278, which may be ganged, permits the operator to control the percent output, say from 5 to 40 percent.

Figures 13, 14:
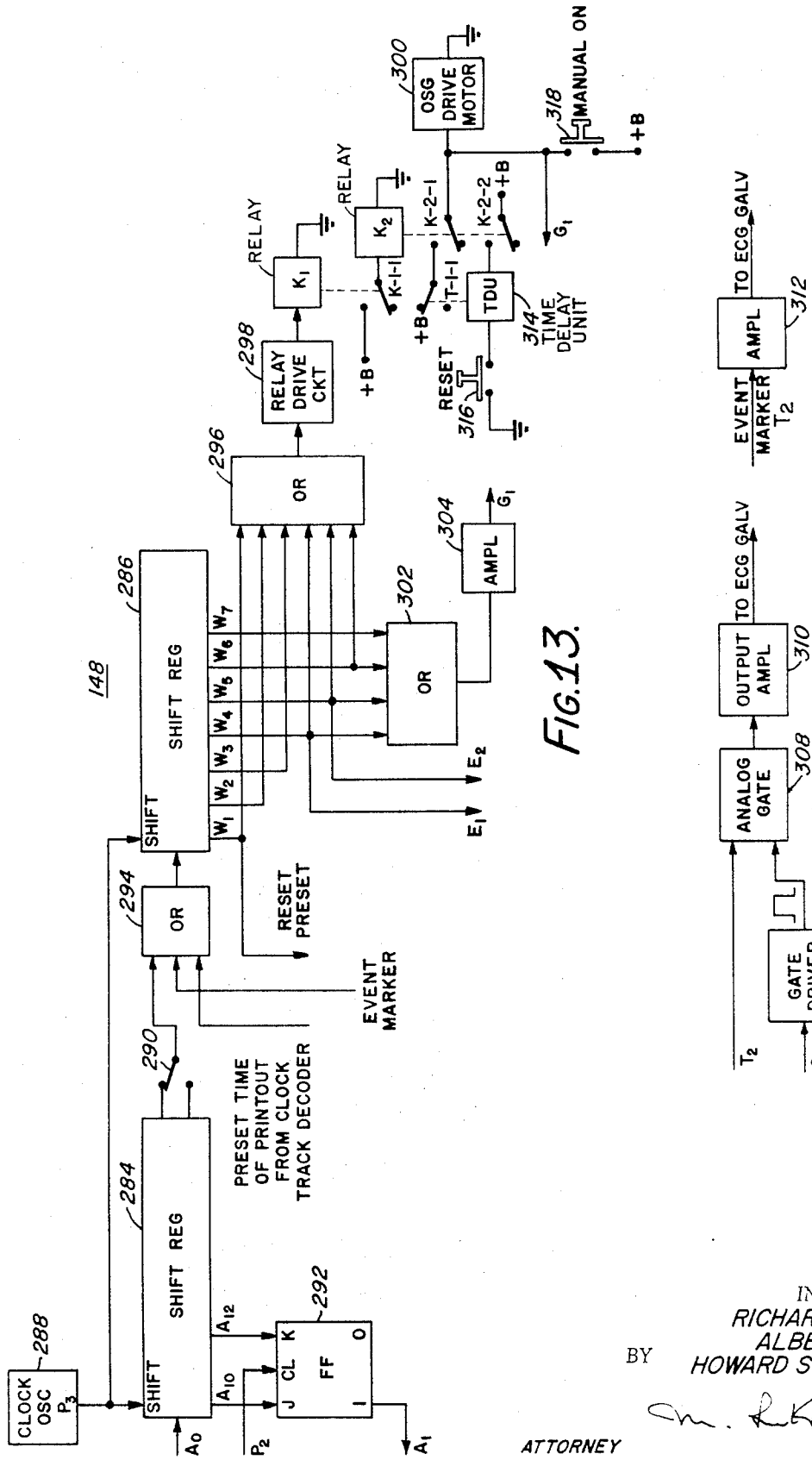
FIG. 13 is a block diagram of the oscillograph control system shown in FIG. 7.
FIG. 14 is a block diagram of a further portion of the oscillograph control system which is shown in FIG. 7.

The oscillograph control system 148 is shown in FIGS. 13 and 14. It includes two shift registers 284 and 286 connected in tandem. The alarm pulse $A_o$ from the control signal generator is inputted to the first stage of the first shift register. The first register has sufficient stages to provide the requisite delay considering the repetition rate of shift pulses from a clock oscillator 288 having a repetition rate $P_3$, to compensate for the delay in the ECG signal in passing from head 82 to 86 (FIG. 4). Depending on the tape speed, a fewer or greater number of stages may be utilized; the selection being made with a switch 290. The repetition rate of the clock pulses $P_3$ is desirably approximately 40 Hz such that complete cardiac cycles can be recorded in a clock pulse period.

The reset pulses $A_1$ are generated by a JK flip-flop 292 which are connected to the first stage of the shift register 284. The flip-flop 292 is set when the $A_o$ pulse enters the first stage and re-set when it leaves the first stage by the high-frequency clock $P_2$. (This is the clock preferably having a repetition rate of over 100 KHz). Thus, a re-set pulse can be generated at the end of a $P_3$ clock pulse interval after an alarm $A_o$ pulse enters the shift register 284.

The output of the first shift register is applied to the second shift register 286 via an OR gate 294. This OR gate is also used to input an oscillograph enabling signal indicated as "preset time of print-out from clock track decoder." As will be explained in connection with FIG. 15, an output can be obtained at various times which can be preset say when the patient is made to undergo certain stresses. At that time the cardiologist may desire a permanent hard copy readout, in which case the preset time of printout of the electrocardiogram is provided.

The event marker pulses at time $T_o$ from the one-shot 114 (FIG. 4) may also be inputted to the OR gate 294 when an oscillogram during event-marker periods is desired.

The shift register 286 has seven stages indicated as $W_1$ through $W_7$. When an $A_o$ pulse or one of the other pulses inputted via the OR gate 294 is shifted through the register 286 and is in the first six stages thereof, it provides an operating signal via an OR gate 296 to a relay drive circuit 298 which causes a relay $K_1$ to pull in. The contacts K-1-1 of relay $K_1$ connect B+ to another relay K-2. Contacts K-2-1 of the relay K-2 provides operating power to the drive motor 300 of the oscillograph. It will be observed that three clock pulse cycles are used to accommodate the inertia of the drive motor in starting and one clock pulse cycle is not used, thereby permitting the drive motor to stop during the start and stop times the ECG signals are not recorded. In this connection, stages $W_4$ to $W_7$ of the register 286 are OR gated in an OR gate 302 to provide an operating or enabling level when the $A_o$ or other pulse is in the last four stages which is amplified in an amplifier 304 to provide a gate drive pulse $G_1$.

Referring to FIG. 14 the gate drive pulse operates a gate driver circuit 306 such as a transistor amplifier which enables an analog gate 308 which gates the ECG signal at $T_2$ via an output amplifier 310 to the ECG galvanometer on the oscillograph. The oscillograph then for four $P_3$ clock pulse periods will record the ECG signal. These periods will include the period when the control signal indicating an arrhythmia is detected as well as periods immediately preceding and succeeding the arrhythmic sequences. As shown in FIG. 14 the event marker at time $T_2$ is also amplified in an amplifier 312 and may be applied as a gating pulse $G_2$ to record an event marker signal on another track of the oscillograph.

In order to prevent excessively long sequences, a time delay unit (TDU) 314 is operated by applying B+ thereto through the contacts K-2-2. This unit has contact T-1-1 which will disconnect B+ from the OSG drive motor 300, if the relay $K_2$ is pulled in for more than a predetermined period, say, a few seconds. The time delay unit may be reset by a push-button reset switch 316.

Facilities may be provided for turning the oscillograph on manually. These are a push-button switch 318 which connects +B to the drive motor 300 when depressed and also applies a $G_1$ gating signal for the analog gate circuit 306, 308, 310 for the ECG galvanometer (FIG. 14).

Figure 15:
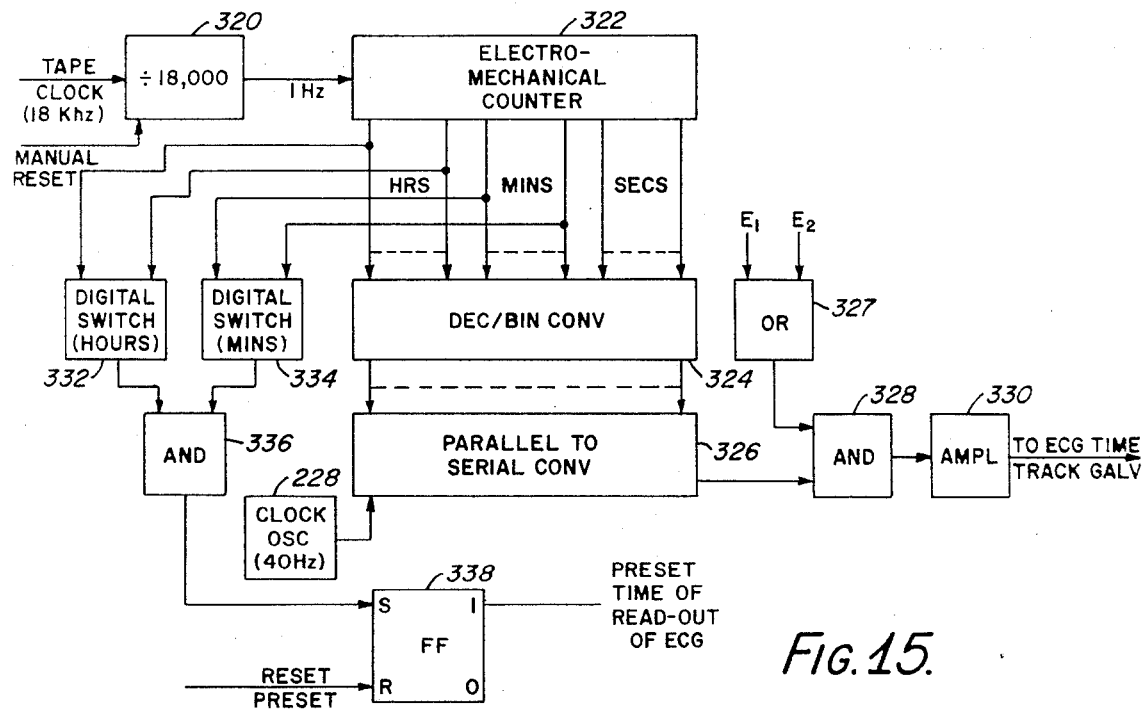
FIG. 15 is a block diagram of the time of day encoder system shown in FIG. 7.

The time code generator system is shown in FIG. 15. It will be recalled that the clock track is recorded in this illustrative embodiment at 18 KHz. A divide by 18,000 counter circuit 320 thus provides 1 Hz pulses which activate an electromechanical counter 322. This electromechanical counter converts the 1 HZ pulses into a plurality of outputs in parallel, representing in digital form, hours, minutes and seconds. A decimal-to-binary converter 324 provides parallel binary outputs to a parallel-to-serial converter 326. The clock oscillator 288 then reads out these codes at the $P_3$ clock rate. Serial bits representing the time code are then gated via an AND gate 328 to a drive amplifier 330 for the oscillograph time track galvanometer. The AND gate 328 is enabled by $E_1$ and $E_2$ levels obtained from the fourth and fifth stages $W_1$ and $W_4$ of the register 286 (FIG.13). Thus, the time code will be recorded on the time track concurrently with the electrocardiogram.

The preset bit is obtained by digital switches 332 and 334 which provides outputs when a certain period of time is reached in the electromechanical counter 322. These outputs are gated in an AND gate 336 and used to set a flip-flop 388. This flip-flop is reset by the reset, preset output from the first stage $W_1$ of the register 286. Accordingly, a preset pulse will appear just like an $A_o$ pulse in the register 286 for a $P_3$ clock pulse interval and cause readout for four cardiac cycles.

The system for controlling the digital printer 156 is shown in FIG. 16. In this illustrative embodiment of the invention, it is desired to operate the printer either at 5 minute or 15 minute intervals. To this end a counter 350 is used to count the 1 Hz signals and provide outputs either after 5 or 15 minutes as may be selected by a switch 352. The time of day encoder 150 consists of the electromechanical clock 322 which provides its parallel outputs via transfer gates 354 to the numerical tape printer 156 after a short delay obtained with a one-shot delay circuit 356. Thus, every 5 or 15 minutes the time code is printed on the printer.

The PVC encoder 154 includes a counter which counts the number of PVC's during either the 5 or 15 minute intervals, since it is reset by the delay circuit output 356 after the selected interval. The counter 350 output pulse then operates transfer gates 362 which apply the counter 360 number in digital form to the printer.

The heart rate encoder similarly includes a counter 364 which counts $R_o$ pulses for either the five or fifteen minute intervals, since it is reset by the delay circuitry 56 output after each such interval. Transfer gate 366, enabled by the counter 364 output, then apply the number stored in the counter 364 to the printer 156 for printing on the tape. Thus the printer provides three columns of printout designating time of day, number of PVC's and heart rate. The printout is repeated at 5 or 15 minute intervals as selected by the switch 352. This entire process may of course be operated at accelerated rates, say 60 times real time, compatible with analysis speed.

From the foregoing description it will be apparent that there has been provided improved physiological information processing systems and methods. While the invention has been described as embodied in a method of and system for electrocardiography, it will be appreciated that variations and modifications in the herein described system will undoubtedly become apparent to those skilled in the art. Accordingly, the foregoing description should be considered merely as illustrative and not in any limiting sense.

What is claimed is:

1. The method of obtaining records of relevant items of physiological information obtained from long term monitoring of a patient over a long period of time, which comprises the steps of
    a. deriving, from said long term monitoring and during a period of time which is short in relation to said long period of time continuously, electrical signals representing a certain physiological function,
    b. detecting from said electrical signals during said short period of time dysfunctions in said certain physiological function and providing first control signals in response thereto,
    c. processing said first control signals to provide from each of said first control signals a plurality of second control signals in time sequence, and
    d. enabling the display of the physiological information represented by said electrical signals upon occurrence of early ones of said second control signals and then producing said display upon occurrence of later ones of said second control signals whereby the display of said information occurs upon occurrance of said dysfunctions thereby eliminating redundant physiological information from said display in spite of said short period of time over which said electrical signals are derived.

2. The invention as set forth in claim 1 including the steps of
    a. generating time code signals continuously and together with said electrical signals during said long period of time,
    b. simultaneously recording said time code signals and said electrical signals both during said long period of time, and
    c. displaying said time code signals simultaneously with said electrical signals thereby identifying the time of occurrence of said dysfunctions on said display.

3. The invention as set forth in claim 2 including the steps of
    a. translating said electrical signals into digital codes representing certain characteristics of said physiological function, and
    b. printing numerical representations of said digital codes after discrete periods established by said time code signals.

4. The invention as set forth in claim 1 wherein said detecting step comprises the steps of deriving digital information representing said dysfunctions processing said digital information to provide said first control signals, storing said first control signals , and decoding said stored first control signals for selected time intervals related to the occurrence of said electrical signals in said long term to provide said second control signals.

5. The method of electrocardiography with the aid of electrical signals which represent cardiac cycles and which occur in real time, said method comprising the steps of
    a. obtaining said electrical signals which represent cardiac cycles and which occur in real time,
    b. processing at greater than real time said electrical signals to derive first control signals concurrent with those of said cardiac cycles having characteristics representing certain dysfunctions,
    c. processing said first control signals to produce for each of said first control signals a plurality of second control signals in time sequence, and
    d. producing an electrocardiogram of said electrical signals in response to said second control signals by enabling the production of said electrocardiogram upon occurrence of early ones of said second control signals and initiating the production of said electrocardiogram upon occurrence of later ones of said second control signals, whereby to provide a permanent record of a limited number of said cycles which are inclusive of those of said cycles from which said first control signals result.

6. The invention as set forth in claim 5 wherein said step of processing said electrical signals includes the steps of
   a. maintaining said electrical signals at said greater than real time rate throughuout their entire cardiac cycles,
   b. detecting from said electrical signals the presence of certain waves each in a separate one of said cardiac cycles, and
   c. deriving from said waves the presence of a plurality of arrhythmias and dysfunctions, and
   d. selectively producing said first control signals when said arrhythmias and dysfunctions are present.

7. The invention as set forth in claim 6 wherein said electrical signal processing step further includes the step of deriving from said waves the presence of cardiac arrests in said waves, and producing control signals when said arrests are present.

8. The invention as set forth in claim 6 further comprising the step of producing from said electrical signal, successive oscilloscope displays of each of said cardiac cycles, and synchronizing each said oscilloscope displays at the times of detection of the presence of said certain waves.

9. The invention as set forth in claim 6 wherein said deriving step includes the steps of
   a. detecting when the period between successive ones of said certain waves is outside the limits of a predetermined interval of time, and thereupon producing said arrhythmia representing first control signals.

10. The invention as set forth in claim 9 including the steps of
    a. producing said first control signals when said period between said successive waves is before the early or lower one of said limits of said interval, and
    b. producing said first control signals when said last named period is after the later or upper one of said limits of said interval.

11. The invention as set forth in claim 6 whereim said certain waves from said successive cardiac cycles are separated by intervals, and wherein said electrical signal processing step further comprises:
    a. while sensing the intervals between successive pairs of said certain waves, detecting the ratio between said intervals between said successive pairs of said certain waves, and
    b. thereafter producing said arrhythmia representing control signals when said ratio is outside a given range.

12. The invention as set forth in claim 11 including the step of adjusting said given range wherein said arrhythmia representing first control signals are produced thereby selecting the degree of arrhythmia which can produce said first control signals.

13. A system for obtaining relevant portions of physiological information obtained from monitoring a patient continuously over a long period at real time to provide the total quantity of said information,
    a. means for deriving from said total quantity of said information, continuously, and at greater than real time, electrical signals representing a certain physiological function,
    b. means for detecting from said electrical signals dysfunctions in said certain physiological function and providing first control signals in response thereto,
    c. means for providing from each of said first control signals a plurality of second control signals which occur in time sequence,
    d. means for displaying the waveforms represented by said electrical signals, and
    e. means for enabling said displaying means upon occurrence the earlier ones of said second control signals and for operating said displaying means upon occurrence of later ones of said second control signals whereby to provide displays at greater than said real time rate including the periods of occurrence of said dysfunctions thereby obtaining displays of relevant portions of the total quantity of said physiological information.

14. The invention as set forth in claim 13 wherein said displaying means include
    a. means for graphically recording said electrical signals,
    b. means for mechanically actuating said graphic recording means in response to said earlier second control signals, and
    c. means for enabling the electrical operation of said graphic recording means to record said electrical signals in response to said later second control signals.

15. The invention as set forth in claim 14 including
    a. means for generating time code signals having a frequency corresponding to said real time rate continuously and together with said electrical signals, and
    b. means for applying said time code signals to said graphically recording means for recording the real time corresponding to said time code simultaneously with said electrical signals thereby identifying the time of occurrence of said dysfunctions.

16. The invention as set forth in claim 15, including
    a. means for translating said electrical signals into digital codes numerically representing certain characteristics of said physiological function, and
    b. printing means operated by said translating means for printing said codes for providing hard copy contaning numerical representations of said characteristics of said function after discrete periods established by said time code signals.

17. The invention as set forth in claim 13 wherein said detecting means comprises means for deriving digital information representing said dysfunctions, and means included in said second control signal providing means for decoding said digital information at selected time intervals to provide said second control signals.

18. The invention as set forth in claim 17, wherein said decoding means includes
    a. means for storing said digital information representing said first control signals, and
    b. means for reading out said stored digital information at said greater than real time rates for providing said second control signals.

19. The system of electrocardiography which comprise
    a. means for applying to said system electrical signals which represent cardiac cycles and which occur in real time, b. means for processing at greater than real time electrical signals which represent cardiac cycles to derive first control signals concurrent with those of said cardiac cycles having characteristics representing certain dysfunctions, c. means for processing said first control signals to produce in response thereto a plurality of second control signals in time sequence, d. means for producing an electrocardiogram of said electrical signals, to provide a permanent record of a limited number of said cycles which are inclusive of those of said cycles from which said first control signals result, said electrocardiogram producing means including a graphic recorder using a record medium, means responsive to the earlier ones of said second control signals for enabling motion of said medium, and means responsive to the later ones of said second control signals for applying said electrical signal to said recorder to enable graphic recording of the waveforms represented by said electrical signals.

20. The invention as set forth in claim 19 wherein said electrical signals processing means includes a. means for detecting from said electrical signals the presence of a certain wave in each of said cardiac cycles, and b. means responsive to said waves for detecting the presence of arrhythmias, and c. means responsive to said last-named means for producing said first control signals when said arrhythmias are present.

21. The invention as set forth in claim 20 wherein said electrical signals processing means further includes means responsive to said waves for detecting the presence of cardiac arrests, and means operated by said last-named detecting means for producing first control signals when said arrests are present.

22. The invention as set forth in claim 20 further comprising means responsive to said electrical signal for producing successive oscilloscope displays of each of said cardiac cycles, and means responsive to said waves for synchronizing said oscilloscope displays at the times of detection of the presence of said waves.

23. The invention as set forth in claim 20 wherein said detecting means includes means responsive to the period between successive ones of said certain waves, for detecting when the duration of said period is outside the limits of a predetermined interval of time, said last named means including means for establishing said limits.

24. The invention as set forth in claim 23 wherein said detecting means further includes a. means for producing said first control signals when said period between said successive waves is before the early or lower one of said limits of said interval, and b. means for producing said first control signals when said last named period is after the later or upper one of said limits of said interval.

25. The invention as set forth in claim 20 wherein said certain waves from said successive cardiac cycles are separated by intervals, and wherein said electrical signal processing means further comprises a. means, operative while sensing the intervals between successive pairs of said certain waves, for detecting the ratio of the intervals between successive pairs of said certain waves, and b. means operated by said detecting means for producing said arrhythmia representing first control signals when said ratio is outside a given range.

26. The invention as set forth in claim 25 including means for adjusting said range thereby selecting the degree of arrhythmia which can produce said first control signals.

27. An automatic system for processing data at greater than real time from electrical signals representing physiological events which signals are recorded at real time, which system comprises a. means for applying said electrical signals to said system, b. a plurality of means responsive to said applied electrical signals for translating said electrical signals into a plurality of separate digital signals, each corresponding to a different type of said events, c. control means for said digital signals for selectively encoding said digital signals into first control signals, d. means for processing said first control signals at said greater than real time rate to produce a plurality of second control signals, and e. means for graphically recording the waveforms of said applied electrical signals in response to said second control signals, including (i) means for mechanically enabling said recording means upon occurrence of the earlier ones of said second control signals, and (ii) means for electrically enabling said recording means in response to later ones of said second control signals.

28. The invention as set forth in claim 27 wherein said processing means includes a. means for storing said first control signal for predetermined periods of time, and b. means for providing said second control signals during selected portions of the time during which said first control signals are stored.

29. The invention as set forth in claim 27 including a. second means for translating said electrical signals into digital words which represent a selected one of said events, and b. means for reading out said words in the form of a print-out identifying said selected event.

30. The invention as set forth in claim 27, including a. means for generating a time code concurrently with said electrical signals, and b. means for recording said time code in real time simultaneously with said electrical signals, means for playing back said time code at greater than real time simultaneously with said electrical signals, c. means included in said graphic recording means and responsive to said time code from said playback means for recording the time of occurrence of the said waveforms recorded by said graphically recording means.

31. The invention as set forth in claim 30 including second means for translating said digital signals into digital codes which represent a selected one of said events, means for operating said second translating means in response to said time code for encoding digital codes into said second codes which represent the number of said selected events occurring during predetermined intervals of time, and means for reading out said second codes in the form of a print-out identifying the number of said events occurring during certain intervals of time.

32. The invention as set forth in claim 27 including means for producing long-term recordings of said electrical signals, at real time and means for reproducing said recordings at greater than real time and providing said reproduced electrical signals to said translating means.

33. The invention as set forth in claim 32 including
a. means adapted to be connected to a subject for sensing said electrical signals,
b. a radio transmitter for producing a radio signal,
c. means in said transmitter responsive to said electrical signals for modulating said radio signal,
d. means for transmitting said radio signal to a receiving point whereat it is received,
e. receiving means at said receiving point for translating said radio signals to a recording frequency band,
f. a source of constant frequency signals at said receiving point for providing said time code signal,
g. and means at said receiving point for applying said received signals and said constant frequency signals to said recording means for producing said long-term recordings from said received signals and time code signals from said constant frequency signals.

34. The invention as set forth in claim 33 including means in said modulating means for FM-FM modulating said radio signals, and frequency discriminator means included in said receiving means at said receiving point for demodulating said FM-FM signal to provide a carrier FM modulated by said electrical signals, said translating means being operative upon said FM modulated carrier.

35. An automatic electrocardiographic system which processes ECG signals representing electrical patterns of cardiac cycles occurring at greater than real time which comprises
a. means for applying said greater than real time ECG signals to said system,
b. means for recording an electrocardiogram of said greater than real time ECG signals when enabled,
c. means responsive to the occurrence of the R waves in the signals from successive ones of said patterns for providing a plurality of successive control signals each representing the presence of an arrhythmia, and
d. means responsive to earlier ones of each said plurality control signals for mechanically enabling said recording means and being responsive to later ones of each said plurality of control signals for enabling said recording means to record said ECG signals for predetermined periods of time during which the patterns containing said arrhythmias are presented to said recording means.

36. The invention as set forth in claim 35 wherein said R wave responsive means includes means for translating the interval between said R waves into a digital code, and means for providing each of said plurality of control signals when said code differs from a certain numerical value.

37. The invention as set forth in claim 36 wherein said translating means includes means responsive to each of said R waves for producing a plurality of successive timing signals, a counter for generating said code, a source of clock signals having a rate much greater than the repetition rate of said R waves, means responsive to said timing signals for applying said clock signals to said counter, then reading out said code as stored in said counter, and finally resetting said counter.

38. The inventon as set forth in claim 35 wherein said R wave responsive means includes first means for translating the interval between said R waves into a first digital code, and means for providing a first of said plurality control signals when the numerical value of said code is equal to or less than a first numerical value.

39. The invention as set forth in claim 38 including means for translating the interval between said R waves into a second digital code, and means for providing a second of said plurality control signals when said second code equals or exceeds a second numerical value.

40. The invention as set forth in claim 39 including means for selectively adjusting said numerical values whereby to provide different degrees of arrhythmia to which said pluralities of control signals correspond.

41. The invention as set forth in claim 35 including first storing means for said control signals, second storing means for said ECG signals, and means for reading out said control signals and said ECG signals from their respective storing means at rates greater than real time whereby said enabling means when operated by said control signals have their corresponding ECG signals presented thereto to produce a virtual real time recording.

42. The invention as set forth in claim 41 wherein said control signal storing means comprises digital delay means, and said ECG storage means includes record medium playback means having R wave pickup means spaced ahead of ECG signal pickup means along said medium.

43. The invention as set forth in claim 35 wherein said R waves from successive ones of said patterns are separated by intervals, and wherein said R wave responsive means includes means responsive to the ratio in the intervals between successive pairs of said R waves for providing each of said control signals when said ratio exceeds a predetermined limit.

44. The invention as set forth in claim 35 wherein said R waves from successive ones of said patterns are separated by intervals, and wherein said R wave responsive means includes means for translating the interval between successive pairs of said R waves into a ratio representing the proportion of each of said succeeding intervals to its immediately preceding interval, and means for providing said control signal when said proportion exceeds a predetermined percentage.

45. The invention as set forth in claim 35 including an oscilloscope, means for generating a sweep voltage for said oscilloscope synchronized with said R wave, and means for applying a deflection voltage to said oscilloscope corresponding to said ECG signal whereby to individually display said patterns.

46. The invention as set forth in claim 35 including means for generating a time code signal having a frequency equal to the ratio of greater than real time rate to said real time rate concurrently with said ECG signals, a digital printer, means responsive to said ECG signals for detecting the presence of patterns representing PVC conditions and providing output pulses responsive thereto, means responsive to said time code signals and said output pulses for encoding said pulses into codes representing the number of PVC conditions in certain discrete greater than real time intervals, and means for applying said PVC representing codes and time code signal at the end of said discrete time intervals to said printer so as to print out the numerical value of said codes and intervals of real time corresponding to said discrete greater than real time intervals.

47. The invention as set forth in claim 46 including means operated by said R wave signals and said time code signal for repeatedly encoding said R wave signals into digital codes representing heart rate over discrete greater than real time intervals, and means for reading out said heart rate codes and said time code signal to said printer at the end of said discrete time intervals so as to print out the numerical value of said heart rate and the intervals of real time corresponding to discrete greater than real time intervals.

48. The invention as set forth in claim 35 including means for generating a time code signal concurrently with said ECG signal, and means operated by said control signals for applying said time code signal to said recording means whereby to designate the time of occurrence of said recorded arrhythmia patterns.

49. A system for presenting an oscilloscope display of a pattern representing a cardiac cycle from an ECG signal on an oscilloscope having horizontal sweep and vertical deflection circuitry which comprises
   a. means for multiplying the frequency of said ECG signal,
   b. means for providing two outputs of said frequency multiplied ECG signal the second being delayed relative to the first,
   c. means for detecting the occurrence of the R waves of said ECG signals from said first output and providing digital signals in response thereto,
   d. means having storage for a plurality of said digital signals which occur successively,
   e. means for reading said digital signals successively out of said storage means at a rate much higher than the repetition rate of said R waves,
   f. means for applying said digital signals readout of said storage means to said horizontal sweep circuitry for synchronizing the horizontal sweep of said oscilloscope with said digital signals read out of said storage means, and
   g. means for applying said ECG signal from said second output to said vertical deflection circuitry to provide vertical deflection in said oscilloscope.

50. The invention as set forth in claim 49 wherein said storage means is a shift register, and said read out means includes a source of clock signals having a repetition rate much higher than the repetition rate of the cycles of said frequency multiplied ECG signals.

51. A system for detecting arrhythmias from ECG signals which occur at greater than real time which comprises
   a. a counter having a plurality of stages,
   b. a source of clock pulses of repetition rate much higher than said ECG signals,
   c. means for providing an output from said counter when it has counted a certain number of said pulses, and
   d. means responsive to the occurrence of a certain repetitive portion of the waveform of said ECG signal for enabling the application of clock pulses from said source to said counter during the intervals between successive occurrences of said portions and resetting said counter prior to each of said intervals, said means for providing said output from said counter including gating means connected to the stages of said counter which is enabled to provide said output when said counter counts said certain number of pulses, means for storing said output and means for resetting said storage means when said counter is reset.

52. The invention as set forth in claim 51 wherein said counter has a plurality of stages, adjustable digital switches connected between said stages and said gating means for selectively connecting different stages of said counter to the input of said gating means whereby to adjust the count which enables said gating means to provide said output.

53. The invention as set forth in claim 51 including a second source of clock pulses having a repetition rate much higher than the repetition rate of said clock pulses from said first source; timing generator means responsive to said certain portions of said waveforms and said second source clock pulses for generating a sequence of a first, a second and a third timing signals; and means for applying said first for reading out said storing means, the second for resetting said storage means and said counter, and the third for enabling the application of said first source clock pulses to said counter.

54. The invention as set forth in claim 53 wherein said timing generator means includes a plurality of tandem connected flip-flops, means for clocking the first of said plurality of tandem connected flip-flops in response to said certain portions of said waveform and the others of said tandem connected flip-flops by said second source clock pulses.

55. The invention as set forth in claim 51 including a second counter; second gating means; second storing means; means coupling said second gating means to provide a second output to said second storing means when said second counter counts a second certain number of pulses, said second number being higher than said first number; and means responsive to said certain portion of said waveform for enabling the application of said clock pulses to said second counter and for resetting said second counter and said second storage means, all simultaneously with said first named counter and storage means.

56. The invention as set forth in claim 55 including means for reading out an arrhythmia representing signal from said storage means prior to resetting thereof when said first named storage means or said second named storage means does not have stored therein an output from their respective counters.

57. The invention as set forth in claim 56 wherein said certain portion of said waveform is the R wave of said ECG signal, and further including means for inhibiting said arrhythmia signal reading out means for said second storage means in response to an arrhythmia signal from said first arrhythmia signal reading out means, and means responsive to said arrhythmia signals from said reading out means and to said R wave signal for inhibiting said arrhythmia representing signals when successive ones of said R waves have certain time relationships.

58. The invention as set forth in claim 57 wherein said second arrhythmia signal inhibiting means comprises redundant data eliminator means having first and second flip-flop chains, means for applying said arrhythmia signal to clock the flip-flops in said first chain, and deriving said arrhythmia signal therefrom when said first chain flip-flop executes a certain number of changes in state, and means for applying at least one R wave timing signal to clock said second chain, means for interconnecting said chains so as to control the changes in state of said first chain in accordance with the sequence of said arrhythmia signals and said R wave signals.

59. A system for detecting arrhythmias from ECG signals which occur at greater than real time which comprises
   a. a counter having a plurality of stage,
   b. a source of clock pulses of repetition rate much higher than said ECG signals,
   c. means for providing an output from said counter when it has counted a certain number of said pulses, and
   d. means responsive to the occurrence of a certain repetitive portion of the waveform of said ECG signal for enabling the application of clock pulses from said source to said counter during the intervals between successive occurrences of said portions and resetting said counter prior to each of said intervals, wherein said certain portion of said waveform is the R wave of said ECG signal, and means responsive to the absence of a count stored in the highest order stage of said counter for producing an output representing a sinus arrest.

60. A system for detecting arrhythmias from the interval between certain portions of the waveform of the ECG signal of a cardiac cycle, said system comprising
   a. means for detecting those of said intervals which occur between the first and a second successive pairs of said ECG signal portions and translating said intervals into a first output corresponding to the ratio of said intervals,
   b. means for translating said first output into a second output when said ratio is outside given limits,
   c. means for providing said second output upon its occurrence in each cardiac cycle, and
   d. means responsive to said second output from said last named means for indicating the presence of said arryhthmias.

61. The invention as set forth in claim 60 wherein said detecting means includes means responsive to the durations of said intervals for obtaining a signal related to the ratio the interval which said second of said pairs bears to the interval between said first of said pairs, and means for providing said second output when said ratio is outside said given limits.

62. The invention as set forth in claim 60 wherein said detecting means comprises
   a. means for generating first and second voltages having amplitudes proportional to the durations of said intervals,
   b. means for obtaining a voltage corresponding to the ratio of said first and second voltages, and
   c. means for providing said first output when said third voltage is greater or lower than a certain voltage.

63. The invention as set forth in claim 62 including
   a. means included in said generating means for said first and second voltages for providing voltages corresponding to the logarithms thereof, and
   b. means for providing said logarithm voltages to said second output obtaining means.

64. The invention as set forth in claim 62 wherein said voltage generating means comprises a sweep generator for providing a voltage which increases at a certain rate in amplitude, means responsive to said certain portion of said ECG signal for initiating the increase in amplitude of said sweep voltage from a reference level upon occurrence of said certain portion, and means also responsive to said certain portion of said ECG signal for sampling said sweep voltage prior to initiation of said sweep voltage to provide said first and second voltages and for holding said first and second voltages.

65. The invention as set forth in claim 64 including a logarithmic amplifier connected between said sweep generator and said sampling means.

66. The invention as set forth in claim 65 including a difference amplifier input connected to said sampling and holding means outputs.

67. The invention as set forth in claim 66 including a pair of ganged potentiometers for generating reference voltages of opposite polarity, a pair of comparators, each input connected to a different one of said potentiometers and to the output of said difference amplifier, and wherein said means for providing said output includes a gate enabled in response to said certain portions of said ECG signals, when said comparators produce output levels indicative of said difference amplifier output exceeding at least one of said potentiometer reference voltages.

68. In an electrocardiographic system, having an electrocardiogram recorder and an ECG signal analyzer, wherein control signals are generated in response to the occurrence at greater than real time of cardiac cycles represented by the ECG signals and in which certain cardiac events take place also at greater than real time, said recorder having separate signal operated means for mechanical drive and electrical signal recording operations thereof, apparatus for controlling said electrocardiogram recorder to record said cardiac cycles in which said certain events take place so as to produce a virtual real time electrocardiogram, which apparatus comprises
   a. means having storage for said control signals,
   b. means for applying said control signals to said storage means,
   c. means operative when each of said control signals is stored in said storage means, for reading out a plurality of successive electrocardiogram recorder operating signals from said storage means over a period of time corresponding to a plurality of cardiac cycles, and
   d. and means for applying said operating signals to said recorder to enable, first the mechanical and then the electrical operation thereof.

69. The invention as set forth in claim 68 wherein in said electrocardiographic system said cardiac cycles are represented by ECG signals which are multiplied in frequency by a certain number "N", said apparatus further including means in said reading out means for reading out said recorder operating signals each for a period of time equal to 1/N of the periods of said cardiac cycles, and means for applying said frequency multiplied ECG signal to said recorder when said those of operating signals occurring after the interval of a plurality of said 1/N periods whereby the cardiac cycles in which said events take place are recorded.

70. The invention as set forth in claim 68 wherein said storage means is a shift register having a plurality of successive stages; and wherein said reading out means includes means for shifting said control signals through the successive stages of said register, and means connected to a plurality of the successive stages of said register for providing said operating signal when said control signal is shifted therein.

71. The invention as set forth in claim 70 including means for generating clock pulses for shifting said control signals through the successive stages of said register, which clock pulses have a frequency equal to the repetition rate of said cardiac cycles, said rate being multiplied by the same factor as said ECG signals which are applied to said recorder for recording said cycles.

72. The invention as set forth in claim 71 wherein said recorder has drive means for mechanically feeding a record medium therein, and galvanometer means for recording said ECG signals, wherein said operating signal reading out means including means connected to a first group of said plurality of stages for reading out an early operating signal which enables the operation of said drive means, and means connected to a second group of said plurality of stages for reading out a late operating signal which enables the operation of said galvanometer means.

73. The invention as set forth in claim 72 wherein in said electrocardiographic system said ECG signals are recorded on a record medium and wherein in said system said ECG signals for operating said galvanometer are obtained from said record after a certain time delay, said apparatus further including a second shift register having its output connected to the input of said first shift register, said control signals being applied to the input of said second register, and means for applying said clock pulses simultaneously to the shift inputs of both said registers.

74. The invention as set forth in claim 73 including means for generating a serial code which changes successively to designate successive periods of time, and means enabled by outputs from at least one of said second group of stages of said register for applying said serial code to said recorder for recording simultaneously with said cardiac cycles which manifest said events.

* * * * *